US012675020B2

(12) United States Patent
Wang et al.

(10) Patent No.: US 12,675,020 B2
(45) Date of Patent: Jul. 7, 2026

(54) ELECTROCHROMIC FILM, ELECTROCHROMIC DEVICE, ELECTROCHROMIC GLASS, AND VEHICLE

(71) Applicant: FUYAO GLASS INDUSTRY GROUP CO., LTD., Fuqing (CN)

(72) Inventors: Cancan Wang, Fuqing (CN); Jiafu Wang, Fuqing (CN); Shou Lin, Fuqing (CN); Tao Feng, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 279 days.

(21) Appl. No.: 18/424,065

(22) Filed: Jan. 26, 2024

(65) Prior Publication Data

US 2024/0210780 A1　Jun. 27, 2024

Related U.S. Application Data

(63) Continuation of application No. PCT/CN2022/108066, filed on Jul. 27, 2022.

(30) Foreign Application Priority Data

Jul. 28, 2021　(CN) .......................... 202110855824.7

(51) Int. Cl.
G02F 1/155　(2006.01)
B60J 3/04　(2006.01)

(52) U.S. Cl.
CPC ................ *G02F 1/155* (2013.01); *B60J 3/04* (2013.01)

(58) Field of Classification Search
CPC . G02F 1/15; G02F 1/155; G02F 1/153; G02F 1/1533; G02F 1/1525; G02F 1/157;
(Continued)

(56) References Cited

U.S. PATENT DOCUMENTS 6,317,248 B1 * 11/2001 Agrawal ................. G02F 1/155
　　　　　　　　　　　　　　　　　348/148
6,795,226 B2 * 9/2004 Agrawal ................. G02F 1/163
　　　　　　　　　　　　　　　　　359/254
(Continued)

FOREIGN PATENT DOCUMENTS

CN　　104834103 A　　8/2015
CN　　108646495 A　　10/2018
(Continued)

OTHER PUBLICATIONS

International Search Report dated Aug. 30, 2022 issued in PCT/CN2022/108066.
(Continued)

*Primary Examiner* — Jie Lei
(74) *Attorney, Agent, or Firm* — Scully, Scott, Murphy & Presser, P.C.

(57) ABSTRACT

An electrochromic film, an electrochromic device and a method for manufacturing the same, electrochromic glass, and a vehicle are provided. The electrochromic film includes a first transparent conductive layer, a second transparent conductive layer, and an electrochromic functional layer. Each transparent conductive layer is provided with multiple electrode sub-lines arranged at intervals on an edge of at least one side of said each transparent conductive layer. On a plane where the first transparent conductive layer or the second transparent conductive layer is located, orthographic projections of the multiple electrode sub-lines of the first transparent conductive layer have at least a non-overlapping part with orthographic projections of the multiple electrode sub-lines of the second transparent conductive layer. The electrochromic functional layer is disposed between the first transparent conductive layer and the second transparent conductive layer.

14 Claims, 12 Drawing Sheets

100

(58) Field of Classification Search
    CPC ........ G02F 1/1523; G02F 1/163; G02F 1/161;
                G02B 5/32; G02B 27/2228; B60J 3/04;
                B60J 3/00; B60J 3/007
    USPC ................. 359/265, 266, 269–271, 273–275
    See application file for complete search history.

(56) References Cited

U.S. PATENT DOCUMENTS

| | | | |
|---|---|---|---|
| 2003/0047457 A1* | 3/2003 | Rukavina ................ | G02F 1/163 |
| | | | 205/118 |
| 2010/0014145 A1 | 1/2010 | Jang et al. | |
| 2011/0260961 A1 | 10/2011 | Burdis | |
| 2012/0062976 A1 | 3/2012 | Burdis | |
| 2019/0011793 A1 | 1/2019 | Jack et al. | |
| 2019/0346731 A1 | 11/2019 | Topinka et al. | |
| 2020/0041857 A1 | 2/2020 | Wang et al. | |
| 2021/0173278 A1 | 6/2021 | Wang et al. | |

FOREIGN PATENT DOCUMENTS

| | | |
|---|---|---|
| CN | 208126073 U | 11/2018 |
| CN | 110908208 A | 3/2020 |
| CN | 111954846 A | 11/2020 |
| JP | 2011526378 A | 10/2011 |
| JP | 2014529108 A | 10/2014 |
| JP | 2016509264 A | 3/2016 |
| JP | 2016509267 A | 3/2016 |
| KR | 20080069144 A | 7/2008 |
| WO | 2020083562 A1 | 4/2020 |
| WO | 2021119111 A1 | 6/2021 |

OTHER PUBLICATIONS

Chinese First Office Action dated Mar. 30, 2022 issued in CN 202110855824.7.
Chinese Second Office Action dated Aug. 8, 2022 issued in CN 202110855824.7.
Notice of Allowance dated Oct. 28, 2022 issued in CN 202110855824.7.
Notice of Reasons for Refusal dated Nov. 22, 2024 received in Japanese Patent Application No. 2024-505189.
Request for the Submission of an Opinion dated Nov. 18, 2024 received in Korean Patent Application No. 10-2024-7003921.
Extended European search report dated Oct. 2, 2024 received in European Patent Application No. 22848552.0.
Notice of reasons for refusal issued in corresponding JP application No. 2024-505189 dated Jun. 3, 2025.
Notice of final rejection issued in corresponding KR application No. 10-2024-7003921 dated Jul. 29, 2025.

\* cited by examiner

100

100

100

100

100

100

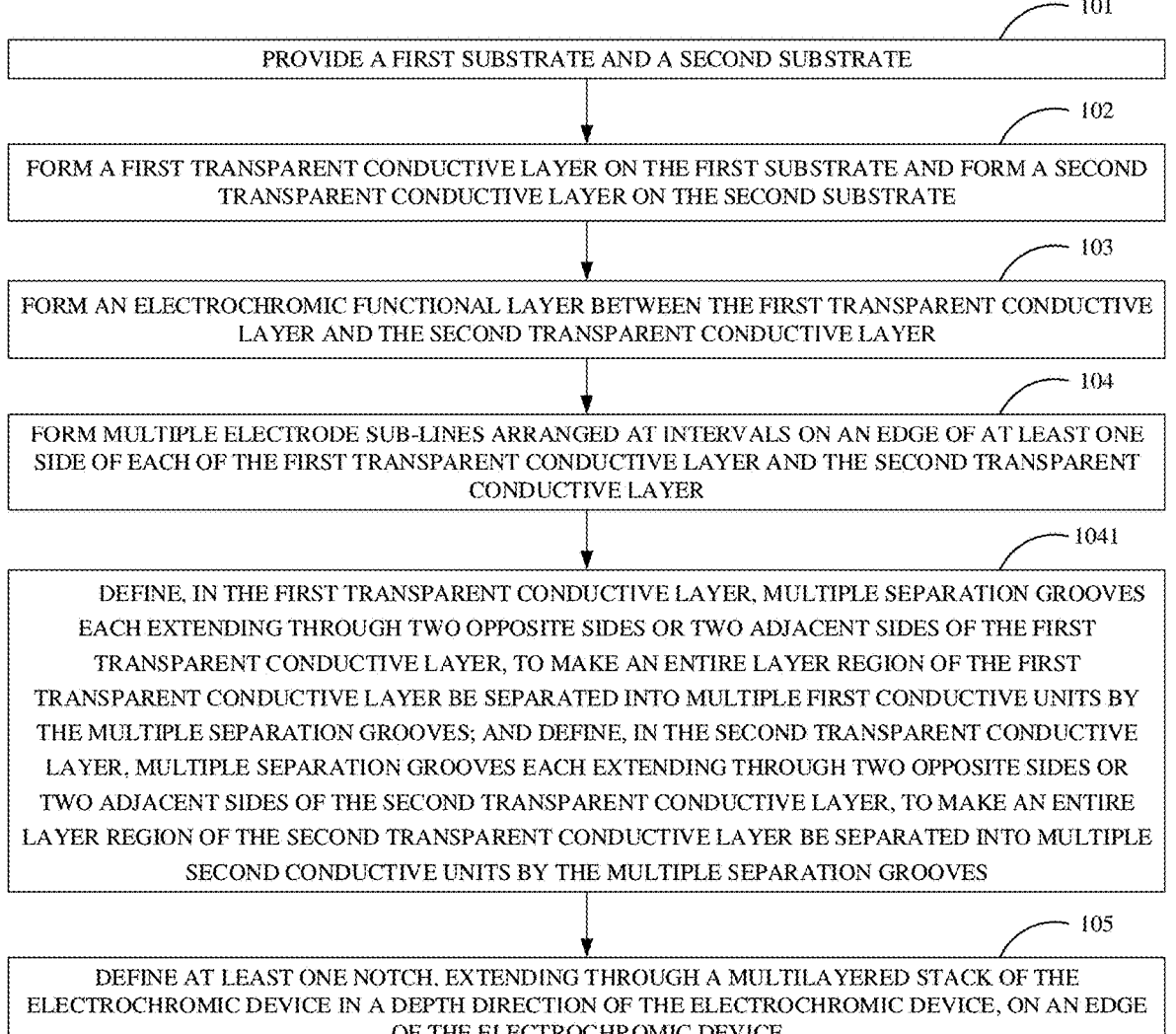

101
PROVIDE A FIRST SUBSTRATE AND A SECOND SUBSTRATE

102
FORM A FIRST TRANSPARENT CONDUCTIVE LAYER ON THE FIRST SUBSTRATE AND FORM A SECOND TRANSPARENT CONDUCTIVE LAYER ON THE SECOND SUBSTRATE

103
FORM AN ELECTROCHROMIC FUNCTIONAL LAYER BETWEEN THE FIRST TRANSPARENT CONDUCTIVE LAYER AND THE SECOND TRANSPARENT CONDUCTIVE LAYER

104
FORM MULTIPLE ELECTRODE SUB-LINES ARRANGED AT INTERVALS ON AN EDGE OF AT LEAST ONE SIDE OF EACH OF THE FIRST TRANSPARENT CONDUCTIVE LAYER AND THE SECOND TRANSPARENT CONDUCTIVE LAYER

1041
DEFINE, IN THE FIRST TRANSPARENT CONDUCTIVE LAYER, MULTIPLE SEPARATION GROOVES EACH EXTENDING THROUGH TWO OPPOSITE SIDES OR TWO ADJACENT SIDES OF THE FIRST TRANSPARENT CONDUCTIVE LAYER, TO MAKE AN ENTIRE LAYER REGION OF THE FIRST TRANSPARENT CONDUCTIVE LAYER BE SEPARATED INTO MULTIPLE FIRST CONDUCTIVE UNITS BY THE MULTIPLE SEPARATION GROOVES; AND DEFINE, IN THE SECOND TRANSPARENT CONDUCTIVE LAYER, MULTIPLE SEPARATION GROOVES EACH EXTENDING THROUGH TWO OPPOSITE SIDES OR TWO ADJACENT SIDES OF THE SECOND TRANSPARENT CONDUCTIVE LAYER, TO MAKE AN ENTIRE LAYER REGION OF THE SECOND TRANSPARENT CONDUCTIVE LAYER BE SEPARATED INTO MULTIPLE SECOND CONDUCTIVE UNITS BY THE MULTIPLE SEPARATION GROOVES

105
DEFINE AT LEAST ONE NOTCH, EXTENDING THROUGH A MULTILAYERED STACK OF THE ELECTROCHROMIC DEVICE IN A DEPTH DIRECTION OF THE ELECTROCHROMIC DEVICE, ON AN EDGE OF THE ELECTROCHROMIC DEVICE

ELECTROCHROMIC FILM, ELECTROCHROMIC DEVICE, ELECTROCHROMIC GLASS, AND VEHICLE

CROSS-REFERENCE TO RELATED APPLICATION(S)

This application is a continuation of International Application No. PCT/CN2022/108066, filed Jul. 27, 2022, which claims priority to Chinese Patent Application No. 202110855824.7, filed Jul. 28, 2021, the entire disclosures of which are incorporated herein by reference.

TECHNICAL FIELD

This disclosure relates to the field of electrochromic elements, and in particular, to an electrochromic film, an electrochromic device, electrochromic glass, and a vehicle.

BACKGROUND

Electrochromism (EC for short) refers to phenomena that optical properties (reflectivity, transmittance, absorptivity, and the like) of materials change stably and reversibly under the action of external electric fields. If the electrochromic technology is applied to vehicle glass, not only can a light intensity inside a vehicle be adjusted, to improve a comfort level inside the vehicle and realize an anti-peeping effect, but also heat radiation inside and outside the vehicle can be selectively absorbed or reflected, thereby reducing the use of an air conditioner to save energy.

SUMMARY

In a first aspect, an electrochromic film is provided in the present disclosure. The electrochromic film includes a first transparent conductive layer, a second transparent conductive layer, and an electrochromic functional layer. The first transparent conductive layer is provided with multiple electrode sub-lines arranged at intervals on an edge of at least one side of the first transparent conductive layer. The second transparent conductive layer is provided with multiple electrode sub-lines arranged at intervals on an edge of at least one side of the second transparent conductive layer. On a plane where the first transparent conductive layer or the second transparent conductive layer is located, orthographic projections of the multiple electrode sub-lines of the first transparent conductive layer have at least a non-overlapping part with orthographic projections of the multiple electrode sub-lines of the second transparent conductive layer. The electrochromic functional layer is disposed between the first transparent conductive layer and the second transparent conductive layer. Each electrode sub-line has an extension direction parallel to the first transparent conductive layer corresponding to said each electrode sub-line or the second transparent conductive layer corresponding to said each electrode sub-line.

In a second aspect, an electrochromic device is provided in the present disclosure. The electrochromic device includes a first substrate, a second substrate, and an electrochromic film. The electrochromic film includes a first transparent conductive layer, a second transparent conductive layer, and an electrochromic functional layer. The first transparent conductive layer is provided with multiple electrode sub-lines arranged at intervals on an edge of at least one side of the first transparent conductive layer. The second transparent conductive layer is provided with multiple electrode sub-lines arranged at intervals on an edge of at least one side of the second transparent conductive layer. On a plane where the first transparent conductive layer or the second transparent conductive layer is located, orthographic projections of the multiple electrode sub-lines of the first transparent conductive layer have at least a non-overlapping part with orthographic projections of the multiple electrode sub-lines of the second transparent conductive layer. The electrochromic functional layer is disposed between the first transparent conductive layer and the second transparent conductive layer. Each electrode sub-line has an extension direction parallel to the first transparent conductive layer corresponding to said each electrode sub-line or the second transparent conductive layer corresponding to said each electrode sub-line. The electrochromic film is disposed between the first substrate and the second substrate. The first substrate faces the first transparent conductive layer. The second substrate faces the second transparent conductive layer.

In a third aspect, electrochromic glass is provided in the present disclosure. The electrochromic glass includes a first glass layer, a second glass layer, and an electrochromic device. The electrochromic device includes a first substrate, a second substrate, and an electrochromic film. The electrochromic film includes a first transparent conductive layer, a second transparent conductive layer, and an electrochromic functional layer. The first transparent conductive layer is provided with multiple electrode sub-lines arranged at intervals on an edge of at least one side of the first transparent conductive layer. The second transparent conductive layer is provided with multiple electrode sub-lines arranged at intervals on an edge of at least one side of the second transparent conductive layer. On a plane where the first transparent conductive layer or the second transparent conductive layer is located, orthographic projections of the multiple electrode sub-lines of the first transparent conductive layer have at least a non-overlapping part with orthographic projections of the multiple electrode sub-lines of the second transparent conductive layer. The electrochromic functional layer is disposed between the first transparent conductive layer and the second transparent conductive layer. Each electrode sub-line has an extension direction parallel to the first transparent conductive layer corresponding to said each electrode sub-line or the second transparent conductive layer corresponding to said each electrode sub-line. The electrochromic film is disposed between the first substrate and the second substrate. The first substrate faces the first transparent conductive layer. The second substrate faces the second transparent conductive layer. The electrochromic device is disposed between the first glass layer and the second glass layer. The first glass layer faces the first substrate. The second glass layer faces the second substrate.

In a fourth aspect, a vehicle is provided in the present disclosure. The vehicle includes the electrochromic glass in the third aspect.

BRIEF DESCRIPTION OF THE DRAWINGS

To describe implementations in the present disclosure or technical solutions in related art more clearly, the accompanying drawings that need to be used in description of implementations or the related art will be briefly introduced below. Apparently, the accompanying drawings in the following description are only some implementations in the present disclosure, and those of ordinary skill in the art may also obtain other accompanying drawings based on these accompanying drawings without creative effort.

FIG. 12 is a flowchart of a method for manufacturing an electrochromic device provided in yet another embodiment of the present disclosure.

The present disclosure will be further described in conjunction with the above accompanying drawings in the following specific implementations.

DETAILED DESCRIPTION

Technical solutions of embodiments in the present disclosure will be described clearly and completely below with reference to accompanying drawings in embodiments of the present disclosure. Apparently, the embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure.

In the description of the present disclosure, it may be noted that orientation or positional relations indicated by terms such as "up", "down", "left", "right", etc., are orientation or positional relations based on the accompanying drawings, only for facilitating description of the present disclosure and simplifying the description, rather than indicating or implying that the referred devices or elements must be in a particular orientation or constructed or operated in the particular orientation, and therefore they may not be construed as limiting the present disclosure. In addition, terms such as "first", "second", etc., are used only for distinguishing illustration, and may not be construed as indicating or implying relativity importance.

Figure 1:
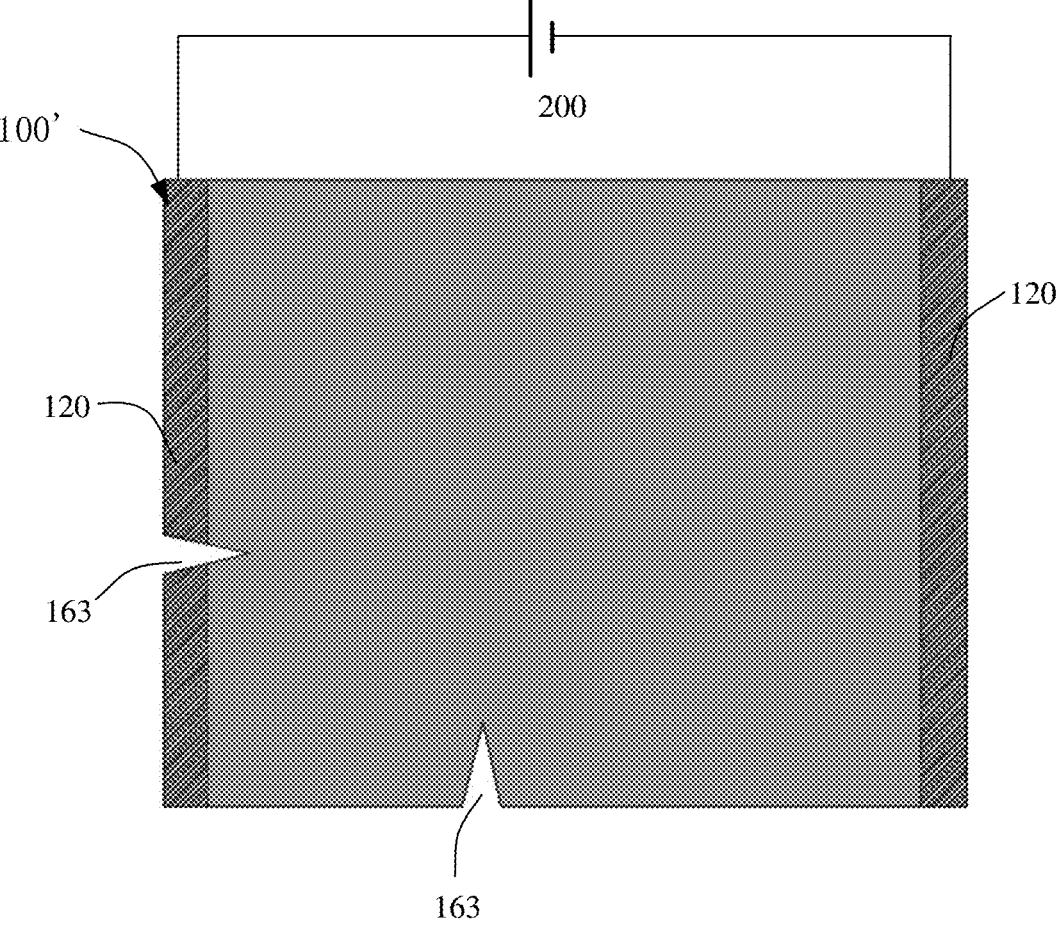
FIG. 1 is a schematic structural view of an existing electrochromic film.

As illustrated in FIG. 1, an existing electrochromic film 100' includes a first transparent conductive layer, an electrochromic functional layer, and a second transparent conductive layer that are stacked in sequence. An external power supply 200 is supplied to the first transparent conductive layer and the second transparent conductive layer through electrode lines 120. Therefore, an electric field is generated between the first transparent conductive layer and the second transparent conductive layer, and thus color and transparency of the electrochromic film 100' are changed. The electrode lines 120 are arranged on an edge of the first transparent conductive layer and an edge of the second transparent conductive layer. An existing wiring manner usually adopts a two-sided wiring manner.

However, after the electrochromic film 100' and a sheet of curved finished glass are laminated, many wrinkles may appear. The wrinkles result from poor fit between the flat electrochromic film 100' and the sheet of curved glass. To solve this problem, as illustrated in FIG. 1, during production, the electrochromic film 100' defines a notch 163 on an edge of the electrochromic film 100' to improve the fit between the electrochromic film 100' and the sheet of curved glass, thereby reducing the wrinkles. However, when the notch 163 is defined on the edge of the electrochromic film 100', the electrode line 120 attached may be cut off, thus causing failure of a large section of the electrode line 120. For example, a large section of the electrode line 120 below a left notch 163 in FIG. 1 will fail. An overlarge voltage drop causes non-uniformity of an electric field in a large-area region of the transparent conductive layer, and reduces a response rate of color change and uniformity of color change of the electrochromic film 100'.

Figures 2, 3:
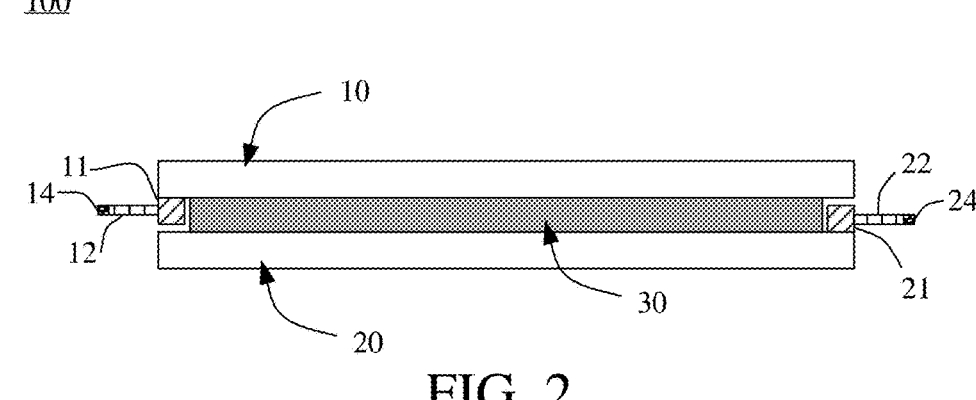
FIG. 2 is a schematic structural view of an electrochromic film provided in one embodiment of the present disclosure.
FIG. 3 is a schematic structural view of transparent conductive layers in FIG. 2.

As illustrated in FIG. 2, an electrochromic film 100 is provided in a first embodiment of the present disclosure. The electrochromic film 100 includes a first transparent conductive layer 10, a second transparent conductive layer 20, an electrochromic functional layer 30, multiple first electrode sub-lines 11, and multiple second electrode sub-lines 21.

It can be understood that FIG. 2 is merely an example of the electrochromic film 100, and does not constitute a limitation on the electrochromic film 100. The electrochromic film 100 may include more "layers" than those illustrated in the figure. For example, the electrochromic film 100 may further include an isolation layer, an electron transport layer, an optical adhesive layer, etc., which is not limited herein.

In an embodiment of the present disclosure, the electrochromic functional layer 30 is disposed between the first transparent conductive layer 10 and the second transparent conductive layer 20.

The first transparent conductive layer 10 and the second transparent conductive layer 20 each have characteristics of high light transmittance and good conductivity. For example, the first transparent conductive layer 10 and the second transparent conductive layer 20 each may include, but are not limited to, a conductive film containing indium tin oxide (ITO), a metal oxide, a metal nanowire, a carbon nanotube, or other materials. A material of the first transparent conductive layer 10 may be the same as or different from a material of the second transparent conductive layer 20.

It may be noted that the term "multiple" in embodiments of the present disclosure refers to the number not less than two. For example, the multiple electrode sub-lines refer to the number of electrode sub-lines not less than two electrode sub-lines, and the specific number of the electrode sub-lines is not limited.

In an embodiment of the present disclosure, multiple electrode sub-lines are arranged at intervals on an edge of at least one side of each of the first transparent conductive layer and the second transparent conductive layer. On a plane where the first transparent conductive layer 10 or the second transparent conductive layer 20 is located, orthographic projections of the multiple electrode sub-lines of the first transparent conductive layer 10 have at least a non-overlapping part with orthographic projections of the multiple electrode sub-lines of the second transparent conductive layer 20. Each electrode sub-line has an extension direction parallel to the first transparent conductive layer corresponding to said each electrode sub-line or the second transparent conductive layer corresponding to said each electrode sub-line. Specifically, the multiple electrode sub-lines being arranged at intervals means that, two adjacent electrode sub-lines on the same edge of each of the first transparent conductive layer and the second transparent conductive layer are spaced apart from each other and are not connected to each other. Orthographic projections of multiple first electrode sub-lines 11 of the first transparent conductive layer 10 on a preset plane do not completely overlap orthographic projections of multiple second electrode sub-lines 21 of the second transparent conductive layer 20 on the preset plane. The preset plane is the plane where the first transparent conductive layer 10 or the second transparent conductive layer 20 is located. Each first electrode sub-line 11 has an extension direction parallel to the first transparent conductive layer 10. Each second electrode sub-line 21 has an extension direction parallel to the second transparent conductive layer 20. In other embodiments, on the plane where the first transparent conductive layer 10 or the second transparent conductive layer 20 is located, the orthographic projections of the multiple electrode sub-lines of the first transparent conductive layer 10 do not have an overlapping part with the orthographic projections of the multiple electrode sub-lines of the second transparent conductive layer 20.

In some embodiments, the multiple electrode sub-lines on each transparent conductive layer are arranged on edges of a pair of opposite sides or two adjacent sides of the transparent conductive layer. Electrode sub-lines at at least one of the pair of opposite sides or the two adjacent sides are arranged at intervals.

Further, as illustrated in FIG. 3, the multiple electrode sub-lines on each transparent conductive layer are arranged on edges of a pair of opposite sides of the transparent conductive layer. Electrode sub-lines at the same side of the pair of opposite sides are arranged at intervals. Electrode sub-lines at one side of the pair of opposite sides and electrode sub-lines at the other side of the pair of opposite sides are arranged in a staggered manner.

Further, in an embodiment, the multiple first electrode sub-lines 11 on the first transparent conductive layer 10 are arranged at intervals on edges of a first pair of opposite sides of the first transparent conductive layer 10. First electrode sub-lines 11 at the same side of the first pair of opposite sides are arranged at intervals. First electrode sub-lines 11 at one side of the first pair of opposite sides and first electrode sub-lines 11 at the other side of the first pair of opposite sides are arranged in alternation. The multiple second electrode sub-lines 21 on the second transparent conductive layer 20 are arranged at intervals on edges of a second pair of opposite sides of the second transparent conductive layer 20.

Second electrode sub-lines 21 at the same side of the second transparent conductive layer 20 are arranged at intervals. Second electrode sub-lines 21 at one side of the second pair of opposite sides and second electrode sub-lines 21 at the other side of the second pair of opposite sides are arranged in alternation. Orthographic projections of the second pair of opposite sides on the plane where the first transparent conductive layer 10 is located overlap the first pair of opposite sides.

For example, as illustrated in FIG. 2 and FIG. 3, multiple (e.g., four) first electrode sub-lines 11 on the first transparent conductive layer 10 are arranged on the edges of the first pair of opposite sides of the first transparent conductive layer 10 and on a side surface of the first transparent conductive layer 10 close to the electrochromic functional layer 30. The first electrode sub-lines 11 at the same side of the first pair of opposite sides are arranged at intervals. The first electrode sub-lines 11 at one side of the first pair of opposite sides and the first electrode sub-lines 11 at the other side of the first pair of opposite sides are arranged in alternation. In other embodiments, the multiple first electrode sub-lines 11 on the first transparent conductive layer 10 may also be arranged on the edges of the first pair of opposite sides of the first transparent conductive layer 10 and on a side surface of the first transparent conductive layer 10 away from the electrochromic functional layer 30. As illustrated in FIG. 3, in this embodiment, the first pair of opposite sides of the first transparent conductive layer 10 are opposite sides extending in direction OY. Specifically, in direction OY, odd numbers of first electrode sub-lines 11 on the first transparent conductive layer 10 are arranged at intervals at a second side 112 of the first transparent conductive layer 10. In direction OY, even numbers of first electrode sub-lines 11 on the first transparent conductive layer 10 are arranged at intervals at a first side 111 of the first transparent conductive layer 10. The first electrode sub-lines 11 at the first side 111 and the first electrode sub-lines 11 at the second side 112 are complementarily arranged in a staggered manner. The total length of all first electrode sub-lines 11 on the first transparent conductive layer 10 is substantially equal to the length of the first side 111 of the first transparent conductive layer 10. In this embodiment, multiple (e.g., four) second electrode sub-lines 21 on the second transparent conductive layer 20 are arranged on the edges of the second pair of opposite sides of the second transparent conductive layer 20 and on a side surface of the second transparent conductive layer 20 close to the electrochromic functional layer 30. In other embodiments, the multiple second electrode sub-lines 21 on the second transparent conductive layer 20 may also be arranged on the edges of the second pair of opposite sides of the second transparent conductive layer 20 and on a side surface of the second transparent conductive layer 20 away from the electrochromic functional layer 30. The total length of all second electrode sub-lines 21 on the second transparent conductive layer 20 is substantially equal to the length of a first side 211 of the second transparent conductive layer 20. The second pair of opposite sides of the second transparent conductive layer 20 are opposite sides extending in direction OY. A structure of the second transparent conductive layer 20 is different from a structure of the first transparent conductive layer 10 in that, in direction OY, odd numbers of second electrode sub-lines 21 on the second transparent conductive layer 20 are arranged at intervals at the first side 211 of the second transparent conductive layer 20, and even numbers of second electrode sub-lines 21 on the second transparent conductive layer 20 are arranged at intervals at a second side 212 of the second transparent conductive layer 20. In this embodiment, after assembly, the first electrode sub-lines 11 on the first transparent conductive layer 10 and the second electrode sub-lines 21 on the second transparent conductive layer 20 are arranged in a staggered manner. On the plane where the first transparent conductive layer 10 or the second transparent conductive layer 20 is located, the orthographic projections of the multiple electrode sub-lines of the first transparent conductive layer 10 do not have an overlapping part with the orthographic projections of the multiple electrode sub-lines of the second transparent conductive layer 20. Therefore, a short circuit between the first electrode sub-line 11 and the second electrode sub-line 21 can be prevented.

In an embodiment of the present disclosure, the first electrode sub-line 11 and the second electrode sub-line 21 each may be formed by methods including, but not limited to, coating a copper foil and/or a silver paste, adhering a metal sheet, a flexible printed board (FPC), etc. Since a projection of a transparent conductive layer opposite to an electrode sub-line covers the electrode sub-line, an insulating layer needs to be additionally disposed on the electrode sub-line, to ensure that two transparent conductive layers are not short-circuited. A conductive material of the other transparent conductive layer, in a coverage region of a projection of an electrode sub-line on the other transparent conductive layer opposite to the electrode sub-line, may also be removed or insulated, to ensure that no short circuit occurs between the two transparent conductive layers.

For example, the multiple first electrode sub-lines 11 may have equal or unequal lengths, and the multiple second electrode sub-lines 21 may have equal or unequal lengths. For example, the multiple first electrode sub-lines 11 and the multiple second electrode sub-lines 21 have equal lengths, and the multiple first electrode sub-lines 11 and the multiple second electrode sub-lines 21 are arranged opposite to each other one by one. In some embodiments, the multiple first electrode sub-lines 11 and the multiple second electrode sub-lines 21 may have unequal lengths, which is not limited herein.

In an embodiment of the present disclosure, the electrochromic film 100 further includes a first bus line 14, a second bus line 24, and multiple lead lines electrically connected to the multiple electrode sub-lines in a one-to-one correspondence. Specifically, the multiple first electrode sub-lines 11 arranged on the first transparent conductive layer 10 are electrically connected to the first bus line 14 through first lead lines 12 that are in a one-to-one correspondence with the multiple first electrode sub-lines 11. Through the first bus line 14, an external power supply is supplied to the multiple first electrode sub-lines 11 to which the first bus line 14 is connected. The multiple second electrode sub-lines 21 arranged on the second transparent conductive layer 20 are electrically connected to the second bus line 24 through second lead lines 22 that are in a one-to-one correspondence with the multiple second electrode sub-lines 21. Through the second bus line 24, the external power supply is supplied to the multiple second electrode sub-lines 21 to which the second bus line 24 is connected. When the electrochromic film 100 is connected to the external power supply, an electric field is generated between the first transparent conductive layer 10 and the second transparent conductive layer 20 due to the external power supply, so that the electrochromic film 100 realizes color change. In an embodiment of the present disclosure, the term "color change" means changes in appearance or optical parameters (such as reflectivity, transmittance, chromaticity, etc.). The first bus line 14 may include one bus line, or may include multiple bus lines. Similarly, the second bus line 24 may include one bus line, or may include multiple bus lines, which is not limited herein.

In some embodiments, the external power supply may also be supplied to the electrode sub-lines on each transparent conductive layer without the corresponding bus line. That is, the external power supply may be supplied to each electrode sub-line individually, as long as it can be ensured that the electrode sub-lines on the same transparent conductive layer keep at the same electric potential when the electrochromic film 100 is connected to the external power supply.

It may be noted that since the transparent conductive layer has high sheet resistance, an operating current may cause a voltage drop during conduction of the operating current to an entire region of the transparent conductive layer. The overlarge voltage drop may cause a lower response rate of the color change and non-uniformity of the color change. If the electrochromic film 100 or 100' is applied to electrochromic glass with a relatively large height of segment, before the electrochromic film 100 or 100' is laminated with a sheet of finished glass, the notch 163 needs to be defined on an edge of the electrochromic film 100 or 100' to improve the fit and reduce wrinkles. Obviously, as illustrated in FIG. 1, when the notch 163 is defined on an edge of an existing electrochromic film 100', a large section of the electrode line 120 may fail. Therefore, a relatively large voltage drop may be generated when the operating current is conducted to a partial region below a left notch 163 of the transparent conductive layer, thereby causing non-uniformity of an electric field in a large-area region of the transparent conductive layer, and prolonging the response time of the electrochromic film 100. Compared to the related art, when the notch 163 is defined on the edge of the electrochromic film 100 provided in an embodiment of the present disclosure, only a small section of the electrode sub-line is cut off to fail. As illustrated in FIG. 3, only a small section of the third first electrode sub-line 11 at the second side 112 of the first transparent conductive layer 10 in direction OY may fail due to the notch 163. Therefore, the conduction of the operating current on the other first electrode sub-lines 11 is hardly affected. It can be understood that when the electrode sub-line arranged on the edge of each transparent conductive layer is shorter in length and denser in arrangement, an influence of defining the notch 163 on a conduction effect of the operating current is smaller. In particular, when the notch 163 is defined in a region where no electrode sub-line is arranged, the influence on the conduction of the operating current is smaller.

For the electrochromic film 100 provided in the present disclosure, the multiple electrode sub-lines are arranged on the edge of the at least one side of each transparent conductive layer. Therefore, when the notch is defined on the edge of the at least one side of each transparent conductive layer, a damage-inefficacy range of the electrode sub-lines can be reduced, and the influence of the voltage drop on the uniformity of the color change and the response rate of the color change can be reduced. Thus, after the notch is defined, the electrochromic film 100 is ensured to change colors quickly and uniformly.

Figure 4A:
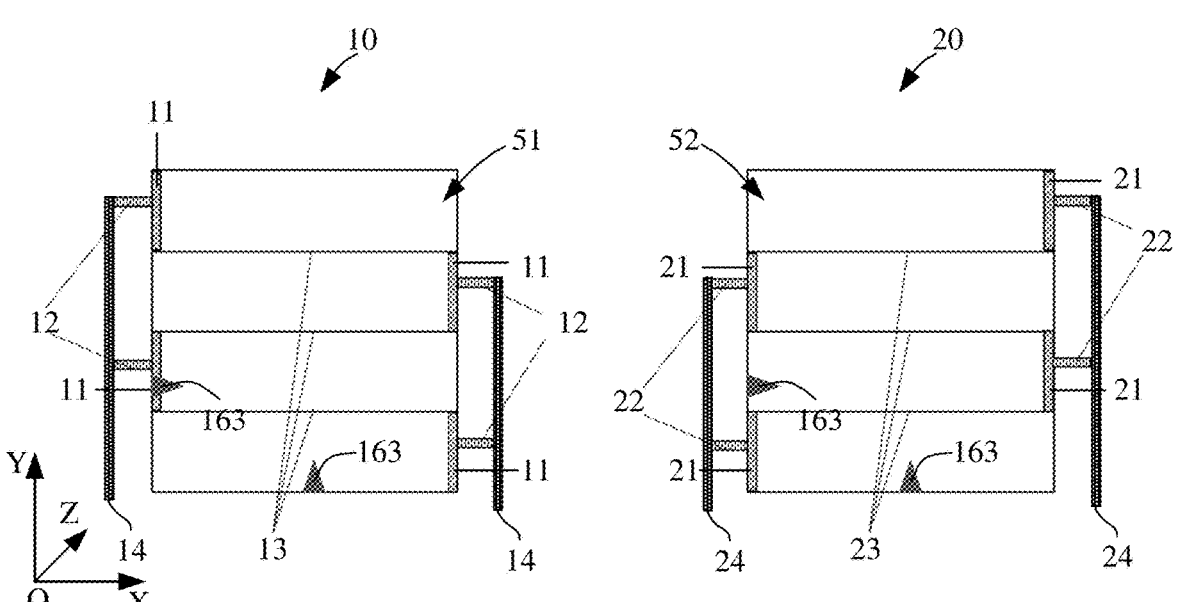
FIG. 4A is a schematic structural view of transparent conductive layers of an electrochromic film provided in another embodiment of the present disclosure.

As illustrated in FIG. 4A, in another embodiment of the present disclosure, each transparent conductive layer of the electrochromic film 100 defines multiple separation grooves extending through two opposite sides or two adjacent sides of the transparent conductive layer. An entire layer region of the transparent conductive layer where the multiple separation grooves are located is separated into multiple conductive units by the multiple separation grooves. Each conductive unit corresponds to one electrode sub-line. Two adjacent conductive units are kept independent from each other by a separation groove. Each electrode sub-line is configured to conduct an operating current substantially uniformly to a corresponding conductive unit when the external power supply is supplied. It can be understood that since the multiple conductive units are kept independent from each other, a conduction effect of the operating current in each conductive unit is not affected by other conductive units. Therefore, even if an electrode sub-line corresponding to one conductive unit is cut off, non-uniform conduction of the operating current in the other conductive units may not be caused.

It may be noted that in an embodiment of the present disclosure, each separation groove extends through two opposite sides or two adjacent sides of the transparent conductive layer, which means that the separation groove separates the transparent conductive layer in a depth direction (direction OZ as illustrated in FIG. 4A), and extends from one side of the transparent conductive layer to an opposite side or an adjacent side of the transparent conductive layer in an extension direction (direction OX as illustrated in FIG. 4A) of the separation groove, so that the transparent conductive layer is completely separated. As illustrated in FIG. 4A, three separation grooves 13 each extend from the first side of the first transparent conductive layer 10 to the second side of the first transparent conductive layer 10, so that the first transparent conductive layer 10 is separated into four independent first conductive units 51.

Specifically, as illustrated in FIG. 4A, the three separation grooves 13 are defined in the first transparent conductive layer 10. Each separation groove 13 extends through the first pair of opposite sides in direction OX. Two ends of each separation groove 13 are respectively connected to ends of two adjacent electrode sub-lines in direction OY. The entire layer region of the first transparent conductive layer 10 is separated into four first conductive units 51 by the three separation grooves 13. Each first conductive unit 51 corresponds to one first electrode sub-line 11. Each first electrode sub-line 11 is configured to conduct the operating current substantially uniformly to the corresponding first conductive unit 51 when the external power supply is supplied. In the same way, each second conductive unit 52 corresponds to one second electrode sub-line 21. In this embodiment, the multiple separation grooves in each transparent conductive layer are substantially parallel to each other. It can be understood that when one electrode sub-line corresponding to each conductive unit substantially completely covers an edge of the conductive unit where the electrode sub-line is located, the operating current has an optimal uniformity during the conduction.

Figure 4B:
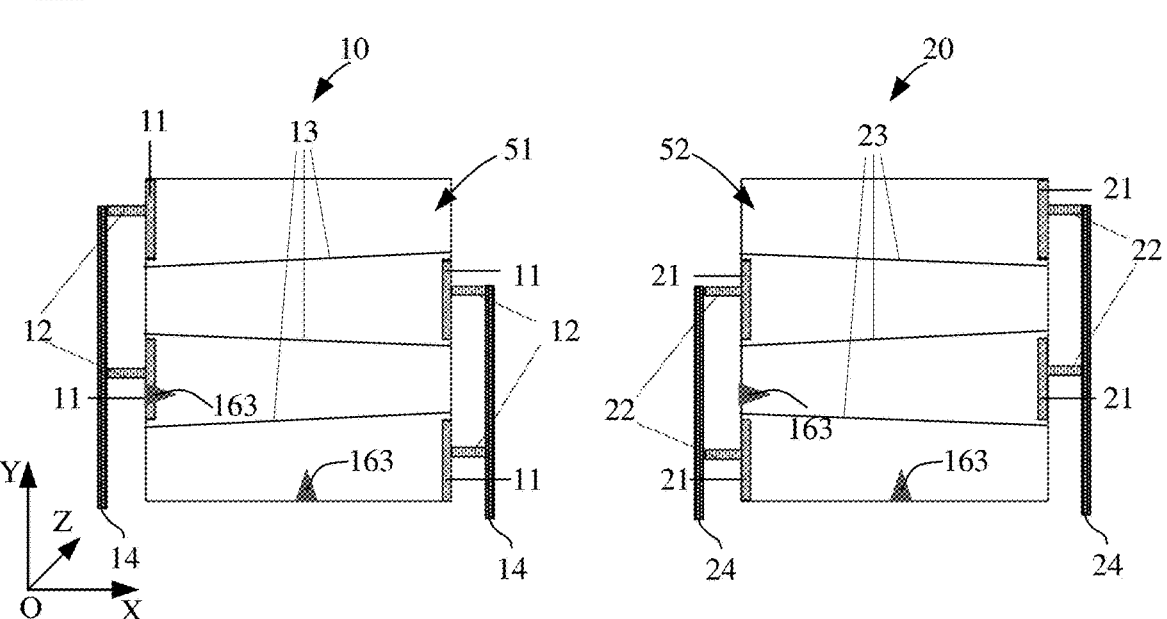
FIG. 4B is a schematic structural view of transparent conductive layers of an electrochromic film provided in yet another embodiment of the present disclosure.

As illustrated in FIG. 4B, in an embodiment, the two ends of the separation groove 13 may also not be connected to the ends of the two adjacent electrode sub-lines in direction OY. As illustrated in FIG. 4B, an extension direction of the separation groove in each transparent conductive layer is at a certain angle to direction OX, such as, 1°-5°. Obviously, in this embodiment, one electrode sub-line corresponding to each conductive unit does not completely cover the edge of the conductive unit where the electrode sub-line is located. Thus, the uniformity of the conduction of the operating current in each conductive unit in this embodiment is not as good as the uniformity of the conduction of the operating current in each conductive unit in the embodiment illustrated in FIG. 4A.

Figure 4C:
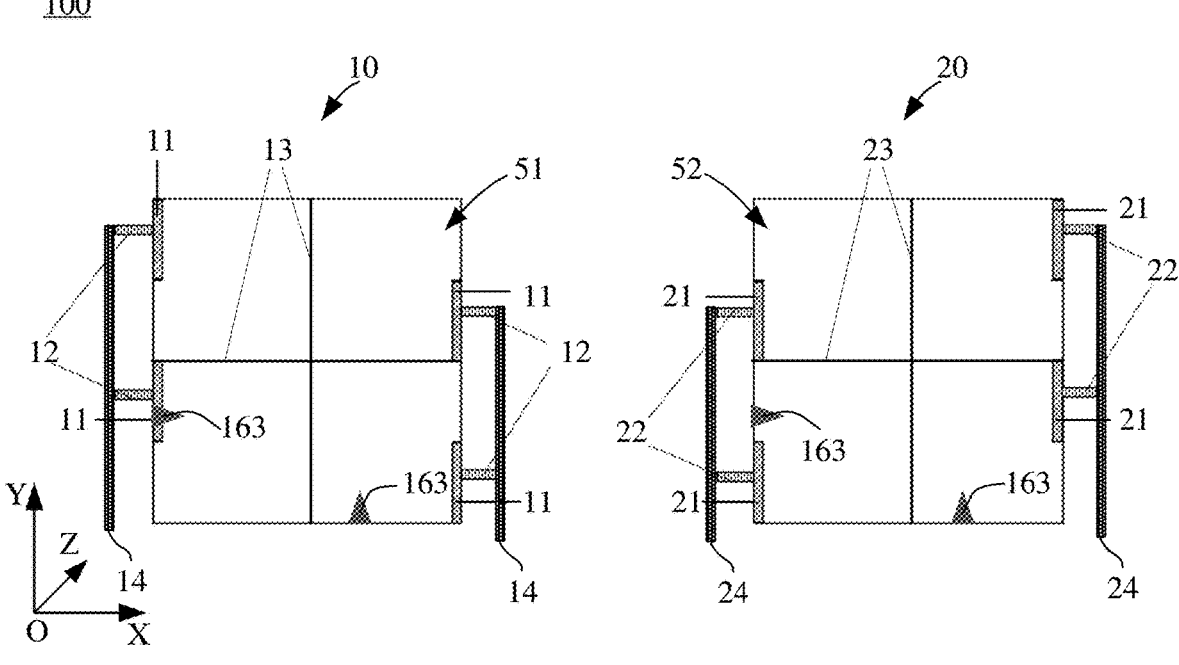
FIG. 4C is a schematic structural view of transparent conductive layers of an electrochromic film provided in yet another embodiment of the present disclosure.

As illustrated in FIG. 4C, in an embodiment, the multiple separation grooves in each transparent conductive layer intersect with each other. Specifically, two separation grooves 13 intersect with each other. The first transparent conductive layer 10 is separated into four first conductive units 51 by the two separation grooves 13. Each first conductive unit 51 corresponds to one first electrode sub-line 11. Two separation grooves 23 intersect with each other. The second transparent conductive layer 20 is separated into four second conductive units 52 by the two separation grooves 23. Each second conductive units 52 corresponds to one second electrode sub-line 21.

In some embodiments, the multiple electrode sub-lines on each transparent conductive layer are arranged at intervals on an edge of one side of the transparent conductive layer.

Further, in an embodiment, the multiple first electrode sub-lines 11 on the first transparent conductive layer 10 are arranged on an edge of the first side of the first transparent conductive layer 10. The multiple second electrode sub-lines 21 on the second transparent conductive layer 20 are arranged on an edge of the second side of the second transparent conductive layer 20. An orthographic projection of the second side on the plane where the first transparent conductive layer 10 is located overlaps an opposite side of the first side.

In an embodiment of the present disclosure, to improve visual perception of a user, the width of each separation groove is limited to the width that cannot be distinguished by naked eyes as much as possible. For example, the multiple separation grooves each have the width of 5 μm-200 μm.

In other embodiments, the multiple separation grooves in each transparent conductive layer are substantially parallel to each other and arranged at equal intervals. It can be understood that when the multiple separation grooves are substantially parallel to each other and arranged at equal intervals, the multiple conductive units are substantially equal in size, and uniformity of conduction of the operating current in each conductive unit is good.

For the electrochromic film 100 provided in the present disclosure, each transparent conductive layer is separated into multiple conductive units by the multiple separation grooves in the transparent conductive layer, so that each electrode sub-line corresponds to one conductive unit. Since the conductive units are kept independent from each other, when the notch 163 is defined on the edge of the electrochromic film 100, only the electrode sub-line on the conductive unit where the notch 163 is located may be cut off. Therefore, an influence range of defining the notch 163 can be narrowed to the conductive unit where the notch 163 is located, thereby ensuring that a conduction effect of an operating current in other complete conductive units is not affected.

As illustrated in FIG. 5-FIG. 8, in some embodiments, the multiple first electrode sub-lines 11 on the first transparent conductive layer 10 are arranged on edges of the first pair of opposite sides of the first transparent conductive layer 10. First electrode sub-lines 11 at the same side of the first pair of opposite sides are arranged at intervals. First electrode sub-lines 11 at one side of the first pair of opposite sides and first electrode sub-lines 11 at the other side of the first pair of opposite sides are arranged in a staggered manner. The multiple second electrode sub-lines 21 on the second transparent conductive layer 20 are arranged on edges of the second pair of opposite sides of the second transparent conductive layer 20. Second electrode sub-lines 21 at the same side of the second pair of opposite sides are arranged at intervals. Second electrode sub-lines 21 at one side of the second pair of opposite sides and second electrode sub-lines 21 at the other side of the second pair of opposite sides are arranged in a staggered manner. Orthographic projections of the second pair of opposite sides on the plane where the first transparent conductive layer is located intersects with the first pair of opposite sides.

Figure 5:
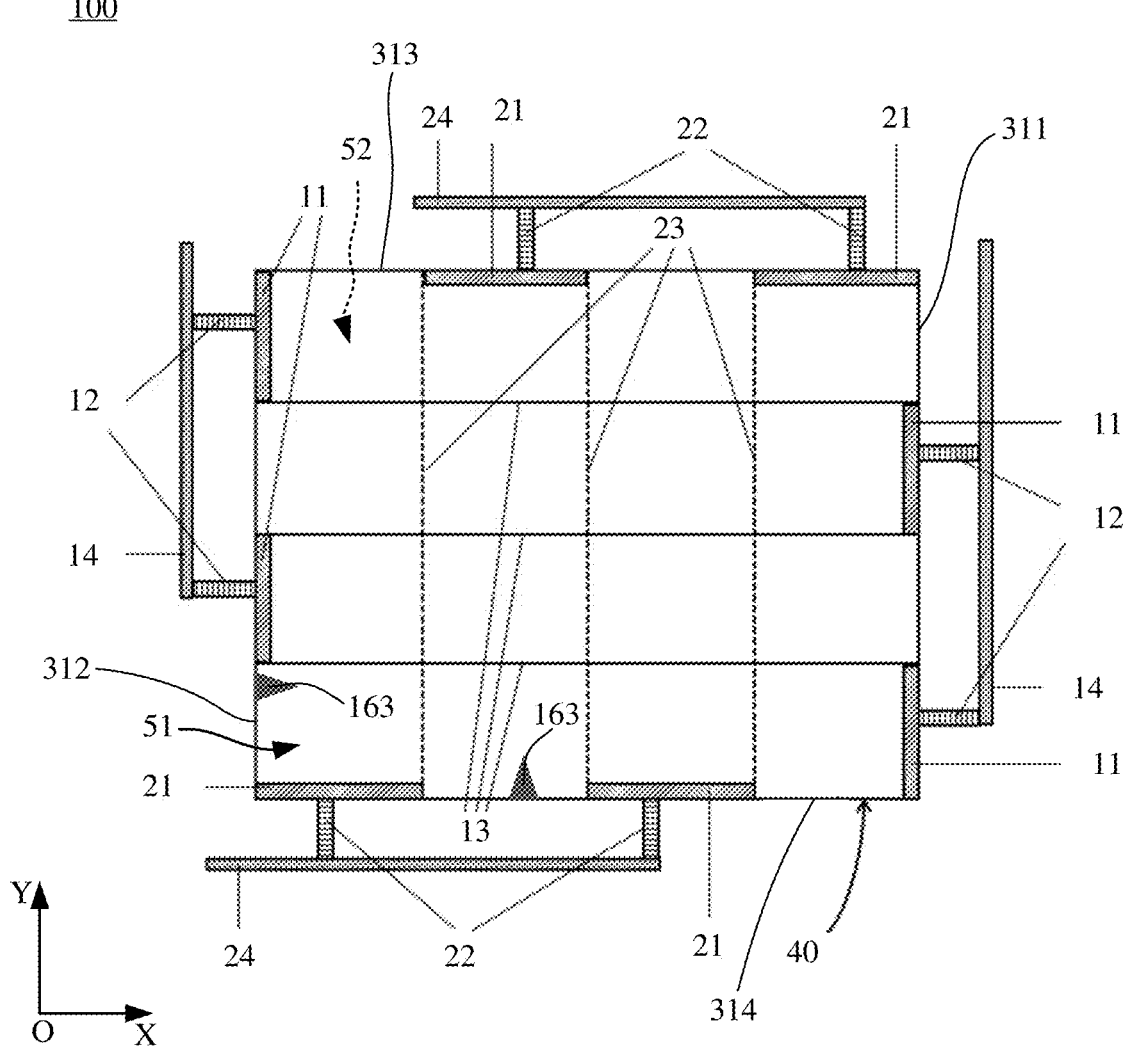
FIG. 5 is a schematic structural view of transparent conductive layers of an electrochromic film provided in yet another embodiment of the present disclosure.

For example, as illustrated in FIG. 5, the multiple first electrode sub-lines 11 on the first transparent conductive layer 10 are arranged at intervals on the edges of the first pair of opposite sides. As illustrated in FIG. 5, in this embodiment, the first pair of opposite sides of the first transparent conductive layer 10 is opposite sides extending in direction OY. Specifically, in direction OY, odd numbers of first electrode sub-lines 11 on the first transparent conductive layer 10 are arranged at intervals at a second side 312 of the first transparent conductive layer 10. In direction OY, even numbers of first electrode sub-lines 11 on the first transparent conductive layer 10 are arranged at intervals at a first side 311 of the first transparent conductive layer 10. The first electrode sub-lines 11 at the first side 311 and the first electrode sub-lines 11 at the second side 312 are complementarily arranged in a staggered manner. Three separation grooves 13 are defined in the first transparent conductive layer 10. Each separation groove 13 extends through the first pair of opposite sides in direction OX. Two ends of each separation groove 13 are respectively connected to ends of two adjacent first electrode sub-lines 11 in direction OY. An entire layer region of the first transparent conductive layer 10 is separated into four first conductive units 51 by the three separation grooves 13. Each first conductive unit 51 corresponds to one first electrode sub-line 11. In other embodiments, the length of the first electrode sub-line 11 completely covers the edge of the first conductive unit 51, but the first electrode sub-line 11 does not cross adjacent separation grooves. Each first electrode sub-line 11 is configured to conduct the operating current substantially uniformly to the corresponding first conductive unit 51 when the external power supply is supplied. The multiple second electrode sub-lines 21 on the second transparent conductive layer 20 are arranged at intervals on the edges of the second pair of opposite sides. As illustrated in FIG. 5, in this embodiment, the second pair of opposite sides of the second transparent conductive layer 20 is opposite sides extending in direction OX. Specifically, in direction OX, odd numbers of second electrode sub-lines 21 on the second transparent conductive layer 20 are arranged at intervals at a fourth side 314 of the second transparent conductive layer 20. In direction OX, even numbers of second electrode sub-lines 21 are arranged at intervals at a third side 313 of the second transparent conductive layer 20. The second electrode sub-lines 21 on the third side 313 and the second electrode sub-lines 21 on the fourth side 314 are complementarily arranged in a staggered manner. Three separation grooves 23 are defined in the second transparent conductive layer 20. Each separation groove 23 extends through the second pair of opposite sides in direction OY. Two ends of each separation groove 23 are respectively connected to ends of two adjacent second electrode sub-lines 21 in direction OX. An entire layer region of the second transparent conductive layer 20 is separated into four second conductive units 52 by the three separation grooves 23. Each second conductive unit 52 corresponds to one second electrode sub-line 21. In other embodiments, the length of the second electrode sub-line 21 completely covers the edge of the second conductive unit 52, but the second electrode sub-line 21 does not cross adjacent separation grooves. Each second electrode sub-line 21 is configured to conduct the operating current substantially uniformly to the corresponding second conductive unit 52 when the external power supply is supplied. It may be noted that the multiple first electrode sub-lines 11 on the first transparent conductive layer 10 are arranged on the first pair of opposite sides (i.e., the opposite sides extending in direction OY), and the multiple second electrode sub-lines 21 on the second transparent conductive layer 20 are arranged on the second pair of opposite sides (i.e., the opposite sides extending in direction OX), so that the edge of the electrochromic film 100 has a notch region 40 where no electrode sub-line is arranged. Therefore, if the notch is defined in the notch region 40, neither the first electrode sub-line 11 nor the second electrode sub-line 21 may be cut off.

It can be understood that the electrode sub-lines of the two transparent conductive layers are arranged on different opposite sides of the electrochromic film 100, and the electrode sub-lines on the pair of opposite sides of the same transparent conductive layer are arranged at intervals and in alternation, so that all edges of the electrochromic film 100 are ensured to have notch regions 40. Therefore, when notches 163 are required to be defined around the electrochromic film 100, it can be ensured that the multiple electrode sub-lines each may not be cut off, so that the conduction effect of the operating current is not affected at all, and the electrochromic film 100 changes colors quickly and uniformly.

In an embodiment of the present disclosure, a spacing between two adjacent separation grooves is determined according to the width of the notch 163 on the edge of the transparent conductive layer. For example, the spacing between the two adjacent separation grooves is not less than twice the width of the notch 163.

Figure 6:
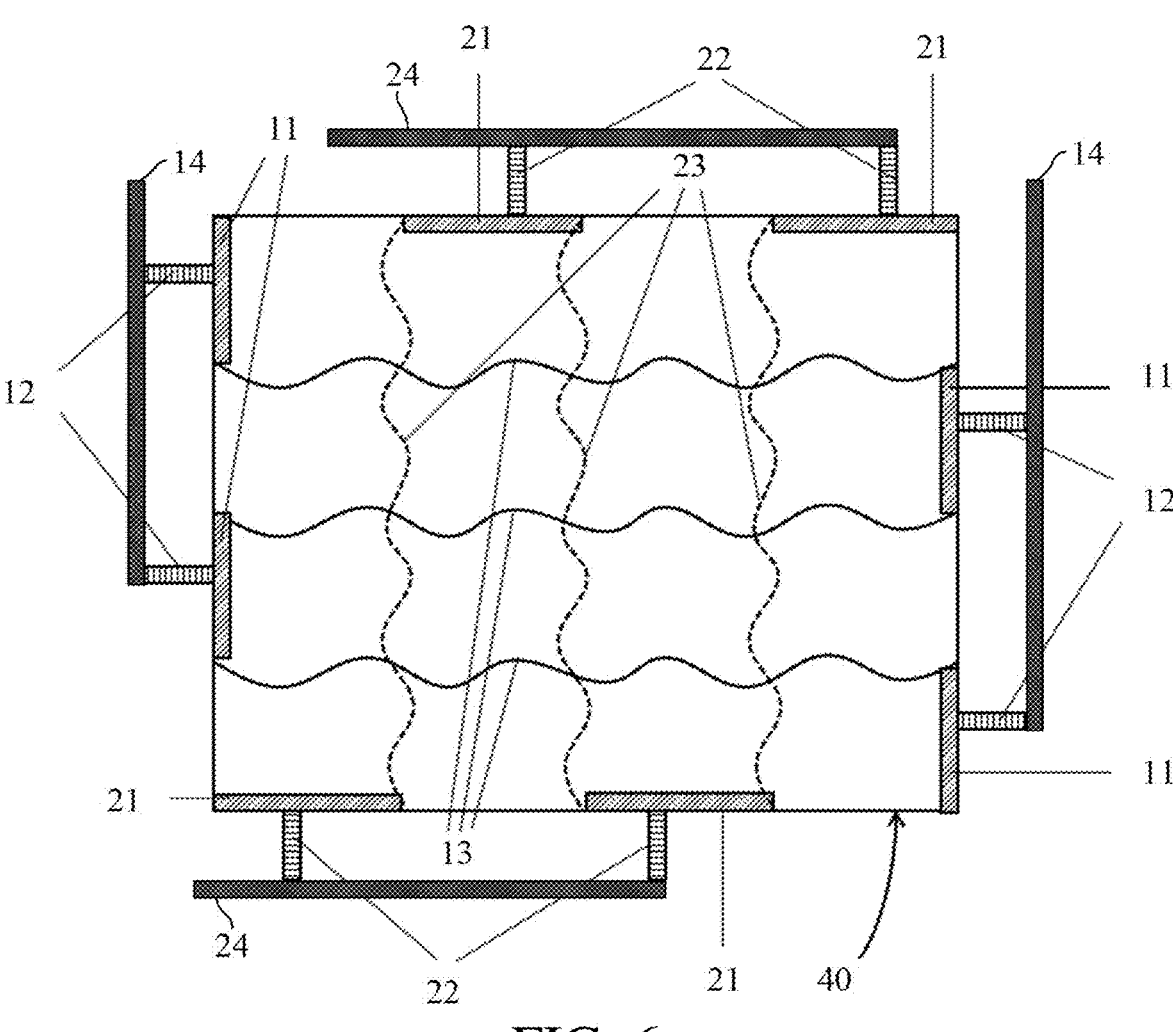
FIG. 6 is a schematic structural view of transparent conductive layers of an electrochromic film provided in yet another embodiment of the present disclosure.

For example, in an embodiment of the present disclosure, the shape of the separation groove may include, but is not limited to, a straight-line type, a wavy-line type (as illustrated in FIG. 6), and a serrated-line type, as long as the transparent conductive layer can be separated into multiple conductive units, and the shape of the separation groove is preferably a straight-line type.

For example, in some embodiments, the multiple separation grooves in each transparent conductive layer are substantially parallel to each other and arranged at equal intervals.

For example, in an embodiment of the present disclosure, the electrode sub-lines on each transparent conductive layer may have equal lengths, or may have different lengths. In some embodiments, the electrode sub-lines on each transparent conductive layer have equal lengths, so that the operating current can be conducted more uniformly. In other embodiments, one electrode sub-line corresponding to each conductive unit substantially completely covers the edge of the conductive unit where the electrode sub-line is located. In other words, the length of the electrode sub-line is no more than the length of the edge of the conductive unit where the electrode sub-line is located.

Figure 7:
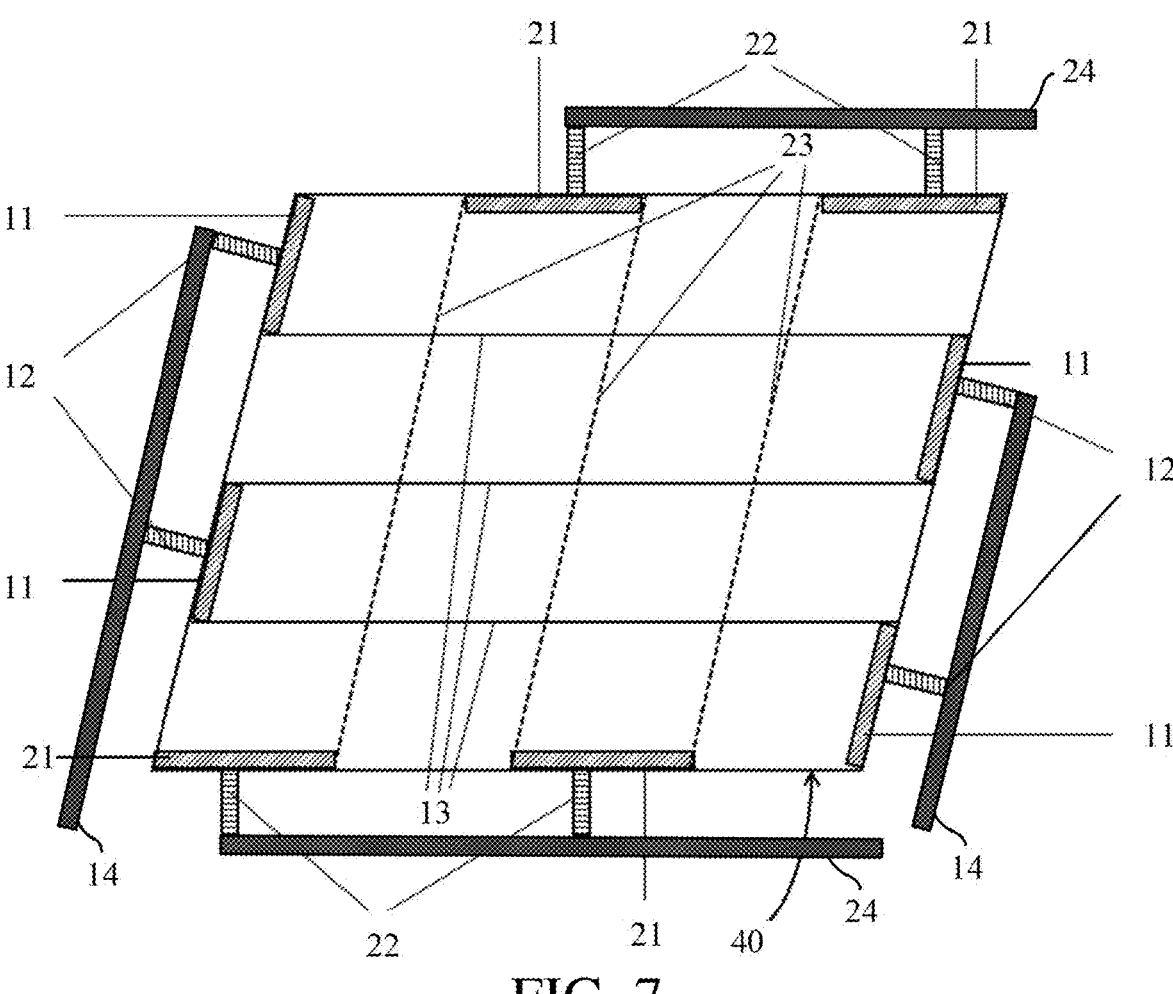
FIG. 7 is a schematic structural view of transparent conductive layers of an electrochromic film provided in yet another embodiment of the present disclosure.

For example, as illustrated in FIG. 7, the electrochromic film 100 is in a parallelogram shape. In other embodiments, the length of the first electrode sub-line 11 completely covers the edge of the first conductive unit 51, but the first electrode sub-line 11 does not cross adjacent separation grooves. The length of the second electrode sub-line 21 completely covers the edge of the second conductive unit 52, but the second electrode sub-line 21 does not cross adjacent separation grooves. The separation grooves 13 in the first transparent conductive layer 10 are parallel to the first pair of opposite sides of the first transparent conductive layer 10 and are arranged at equal intervals. The separation grooves 23 in the second transparent conductive layer 20 are parallel to the second pair of opposite sides of the second transparent conductive layer 20 and are arranged at equal intervals. In this way, the operating current can be conducted more uniformly.

Figure 8:
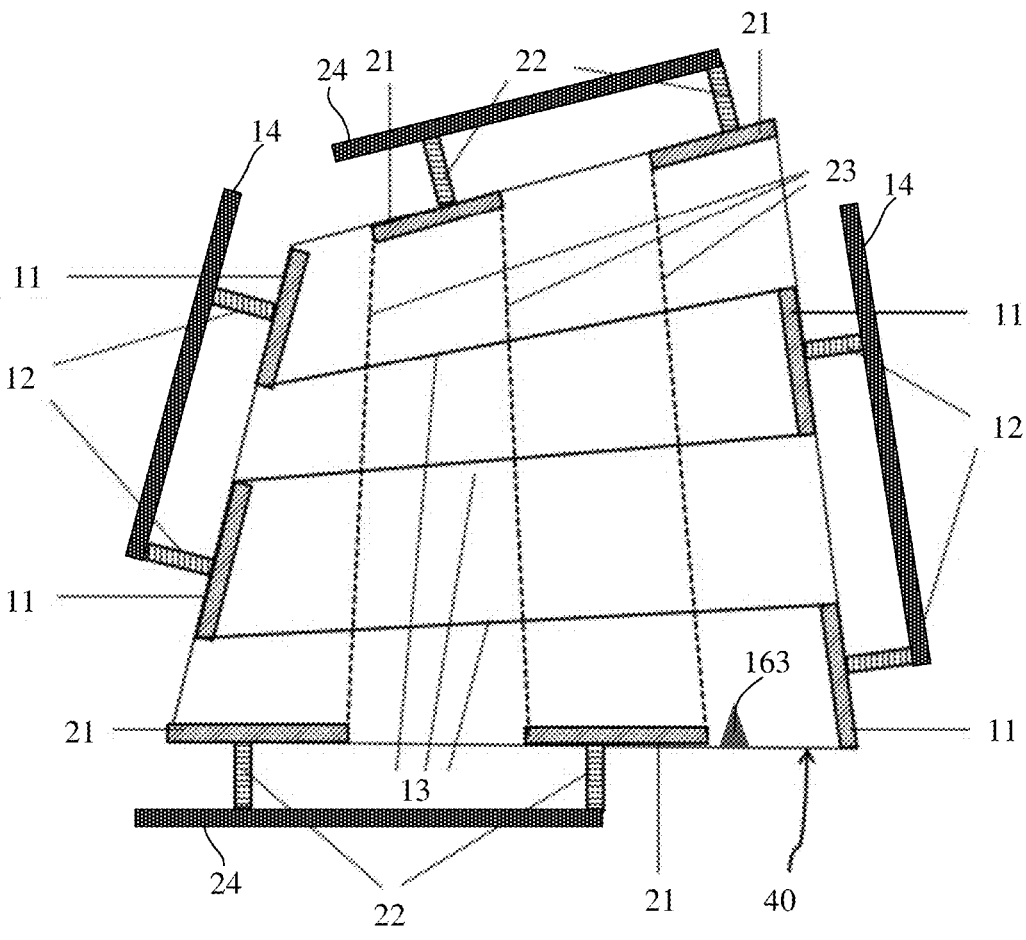
FIG. 8 is a schematic structural view of transparent conductive layers of an electrochromic film provided in yet another embodiment of the present disclosure.

For example, as illustrated in FIG. 8, if the electrochromic film 100 is in an irregular quadrilateral shape, the first electrode sub-lines 11 on the first transparent conductive layer 10 are arranged on the edges of the first pair of opposite sides of the first transparent conductive layer 10. The first electrode sub-lines 11 on two sides of the first pair of opposite sides are arranged in alternation. In other embodiments, the length of the first electrode sub-line 11 completely covers the edge of the first conductive unit 51, but the first electrode sub-line 11 does not cross adjacent separation grooves. The multiple second electrode sub-lines 21 on the second transparent conductive layer 20 are arranged at intervals on the edges of the second pair of opposite sides. The second electrode sub-lines 21 on two sides of the second pair of opposite sides are arranged in alternation. In other embodiments, the length of the second electrode sub-line 21 completely covers the edge of the second conductive unit 52, but the second electrode sub-line 21 does not cross adjacent separation grooves. In this way, the electrochromic film 100 can conduct the operating current substantially uniformly to the entire layer region of the transparent conductive layer. Meanwhile, the electrochromic film 100 has the notch region 40 at which the notch 163 is to be defined, so as to ensure that the conduction of the operating current is hardly affected by the notch 163.

For the electrochromic film 100 provided in the present disclosure, the electrode sub-lines of the two transparent conductive layers are arranged on different opposite sides, so that the edge of the electrochromic film 100 has the notch region 40 where no electrode sub-line is arranged. When the notch is defined in the notch region 40, the electrode sub-line may not be cut off, so that the uniformity of the electric field in the transparent conductive layer can be greatly improved. Thus, the response rate of the electrochromic film 100 is ensured, and the electrochromic film 100 changes colors quickly and uniformly.

Figure 9:
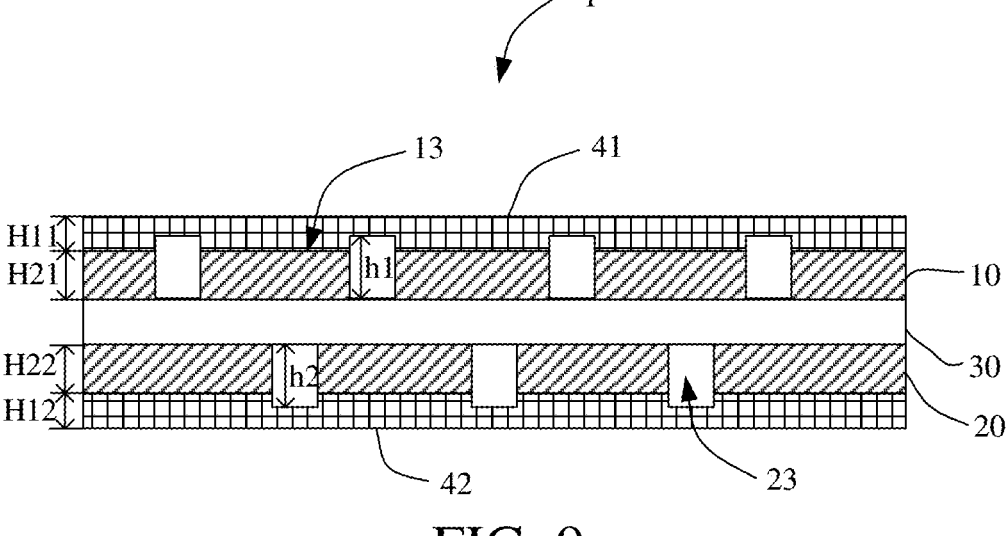
FIG. 9 is a schematic structural view of an electrochromic device provided in an embodiment of the present disclosure.

As illustrated in FIG. 9, an electrochromic device 1 is further provided in an embodiment of the present disclosure. The electrochromic device 1 includes a first substrate 41, a second substrate 42, and the above electrochromic film 100. The electrochromic film 100 is disposed between the first substrate 41 and the second substrate 42. The first substrate 41 faces the first transparent conductive layer 10. The second substrate 42 faces the second transparent conductive layer 20.

For example, the first substrate 41 and the second substrate 42 each have high strength and transparency, and can protect the electrochromic film 100 from external physical damages. The first substrate 41 and the second substrate 42 each may be made of a flexible material or a non-flexible material. The flexible material may be a high polymer material. The high polymer material may include, but is not limited to, polyethylene terephthalate, a polycarbonate material, and a polyacrylic material. The non-flexible material may be glass or an acrylic sheet. The first substrate 41 and the second substrate 42 may be made of the same material or different materials. The above is only an example of the material of the first substrate 41 and the material of the second substrate 42, and cannot be construed as a limitation to the first substrate 41 and the second substrate 42.

In an embodiment of the present disclosure, each transparent conductive layer and a substrate adjacent to the transparent conductive layer constitute a stacked structure. Each stacked structure defines multiple separation grooves each extending through two opposite sides or two adjacent sides of the transparent conductive layer. The entire layer region of the transparent conductive layer where the multiple separation grooves are located is separated into multiple conductive units by the multiple separation grooves. Each conductive unit corresponds to one electrode sub-line. Two adjacent conductive units are kept independent from each other.

Further, each of the multiple separation grooves in the stacked structure of each transparent conductive layer and the substrate extends in a direction from the transparent conductive layer to the substrate. Each of the multiple separation grooves in the stacked structure of each transparent conductive layer and the substrate has the depth greater than or equal to the thickness of the transparent conductive layer, and less than or equal to the sum of the thickness of the transparent conductive layer and 0.5 times the thickness of the substrate. Specifically, the depth $h1$ of the separation groove 13 is no more than $h10$ and no less than $H21$, where $h10=H21+0.5H11$, $H21$ is the thickness of the first transparent conductive layer 10, and $H11$ is the thickness of the first substrate 41. The depth $h2$ of the separation groove 23 is no more than $h20$ and no less than $H22$, where $h20=H22+0.5H12$, $H22$ is the thickness of the second transparent conductive layer 20, and $H12$ is the thickness of the second substrate 42. It may be noted that $H11$ may be equal or unequal to $H12$, and $H21$ may be equal or unequal to $H22$. For example, by means of laser ablation, mechanical cutting, or etching, multiple separation grooves 13 are defined on a first stacked structure that is constituted by the first substrate 41 and the first transparent conductive layer 10. The first transparent conductive layer 10 is completely cut off by the separation groove 13. Meanwhile, the depth of the first substrate 41 being cut is ensured to not exceed 50% of the thickness of the first substrate 41. In this way, not only can two adjacent first conductive units 51 be ensured to be kept independent from each other through the separation groove 13, but also integrity of the first stacked structure can be ensured, facilitating execution of subsequent machining processes. The separation groove 23 is defined in a manner similar to the separation groove 13.

For the electrochromic device 1 provided in the present disclosure, by adopting the above electrochromic film 100, the multiple electrode sub-lines are arranged on the edge of the at least one side of each transparent conductive layer, so that when the notch is defined on the edge of the at least one side of the transparent conductive layer, the damage-inefficacy range of the electrode sub-line can be reduced. Thus, the uniformity of the electric field in the transparent conductive layer can be improved. Further, the response rate of the electrochromic device 1 can be ensured, and the electrochromic device 1 can change colors quickly and uniformly.

Figure 10:
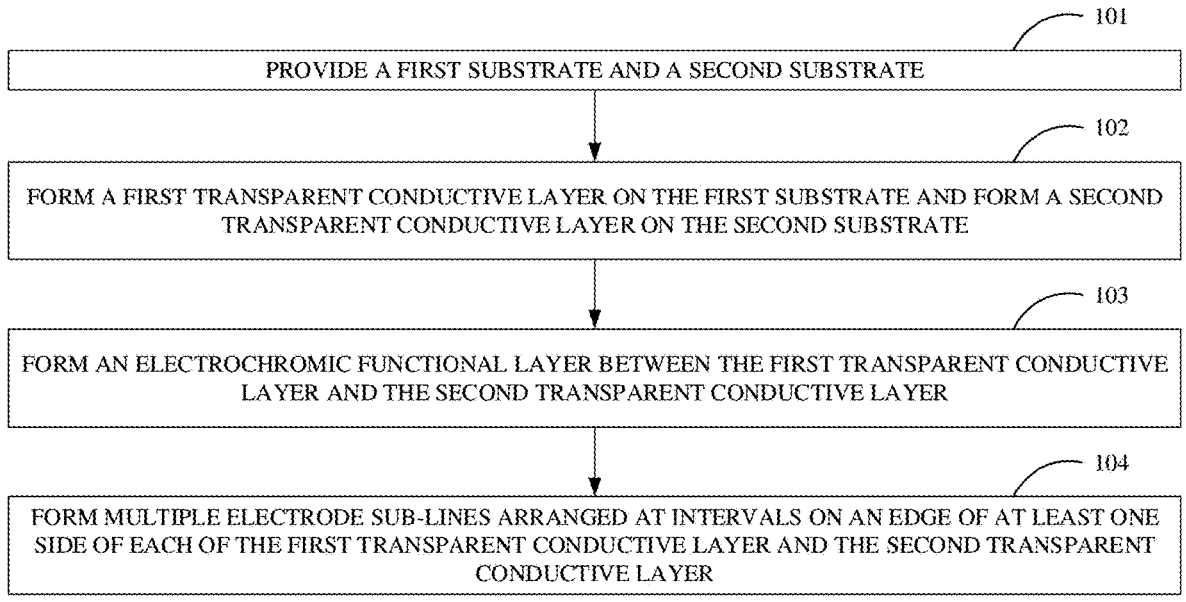
FIG. 10 is a flowchart of a method for manufacturing an electrochromic device provided in one embodiment of the present disclosure.

As illustrated in FIG. 10, a method for manufacturing an electrochromic device 1 is further provided in the present disclosure. The method includes the following.

At 101, a first substrate 41 and a second substrate 42 are provided.

In this embodiment, the first substrate 41 and the second substrate 42 each have high strength and transparency, and can protect the electrochromic film 100 from external physical damages. The first substrate 41 and the second substrate 42 each may be made of a flexible material or a non-flexible material. The flexible material may be a high polymer material. The high polymer material may include, but is not limited to, polyethylene terephthalate, a polycarbonate material, and a polyacrylic material. The non-flexible materials may be glass or an acrylic sheet. The first substrate 41 and the second substrate 42 may be made of the same material or different materials. The above is only an example of the material of the first substrate 41 and the material of the second substrate 42, and cannot be construed as a limitation to the first substrate 41 and the second substrate 42.

At 102, a first transparent conductive layer 10 is formed on the first substrate 41, and a second transparent conductive layer 20 is formed on the second substrate 42.

In this embodiment, the first transparent conductive layer 10 and the second transparent conductive layer 20 each have characteristics of high light transmittance and good conductivity. For example, the first transparent conductive layer 10 and the second transparent conductive layer 20 each may include, but are not limited to, a conductive film containing ITO, a metal oxide, a metal nanowire, a carbon nanotube, or other materials. The first transparent conductive layer 10 and the second transparent conductive layer 20 may be made of the same material or different materials.

Optionally, in an embodiment of the present disclosure, the first transparent conductive layer 10 may be formed by sputtering on the first substrate 41 by magnetron sputtering. Further, the first transparent conductive layer may be an ITO layer. The second transparent conductive layer 20 is formed in a manner similar to the first transparent conductive layer 10.

In some embodiments, to prevent impurity ions in the substrate from diffusing into the transparent conductive layer and affecting the conductivity of the transparent conductive layer, an isolation layer (not shown) is further disposed between the substrate and the transparent conductive layer.

At 103, an electrochromic functional layer 30 is formed between the first transparent conductive layer 10 and the second transparent conductive layer 20.

At 104, multiple electrode sub-lines arranged at intervals on an edge of at least one side of each transparent conductive layer are formed.

On a plane where the first transparent conductive layer 10 or the second transparent conductive layer 20 is located, orthographic projections of the multiple electrode sub-lines of the first transparent conductive layer 10 have at least a non-overlapping part with orthographic projections of the multiple electrode sub-lines of the second transparent conductive layer 20. It can be understood that orthographic projections of the multiple first electrode sub-lines 11 of the first transparent conductive layer 10 on a preset plane do not completely overlap orthographic projections of the multiple second electrode sub-lines 21 of the second transparent conductive layer 20 on the preset plane. The preset plane is the plane where the first transparent conductive layer 10 or the second transparent conductive layer 20 is located. In other embodiments, on the plane where the first transparent conductive layer 10 or the second transparent conductive layer 20 is located, the orthographic projections of the multiple electrode sub-lines of the first transparent conductive layer 10 do not have an overlapping part with the orthographic projections of the multiple electrode sub-lines of the second transparent conductive layer 20.

It may be noted that in the present disclosure, an order of an operation at 103 and an operation at 104 is not limited. In some embodiments, the operation at 104 may be executed first, and then the operation at 103 is executed.

For example, the multiple electrode sub-lines each may be formed by methods including, but not limited to, coating a copper foil and/or a silver paste, adhering a metal sheet, an FPC, etc. In some embodiments, the electrode sub-lines are made of transparent materials. For example, the electrode sub-line may be made of materials including, but not limited to, a silver nanowire conductive film, a carbon nanotube transparent conductive film, or a graphene transparent conductive film.

For the electrochromic device 1 manufactured by the method provided in the present disclosure, the multiple electrode sub-lines are arranged on the edge of the at least one side of each transparent conductive layer. Therefore, when the notch is defined on the edge of the at least one side of the transparent conductive layer, the damage-inefficacy range of the electrode sub-line can be reduced, and the influence of the voltage drop on the uniformity of the color change and the response rate of the color change is reduced. Thus, after the notch is defined, the electrochromic device 1 is ensured to change colors quickly and uniformly.

Figure 11:
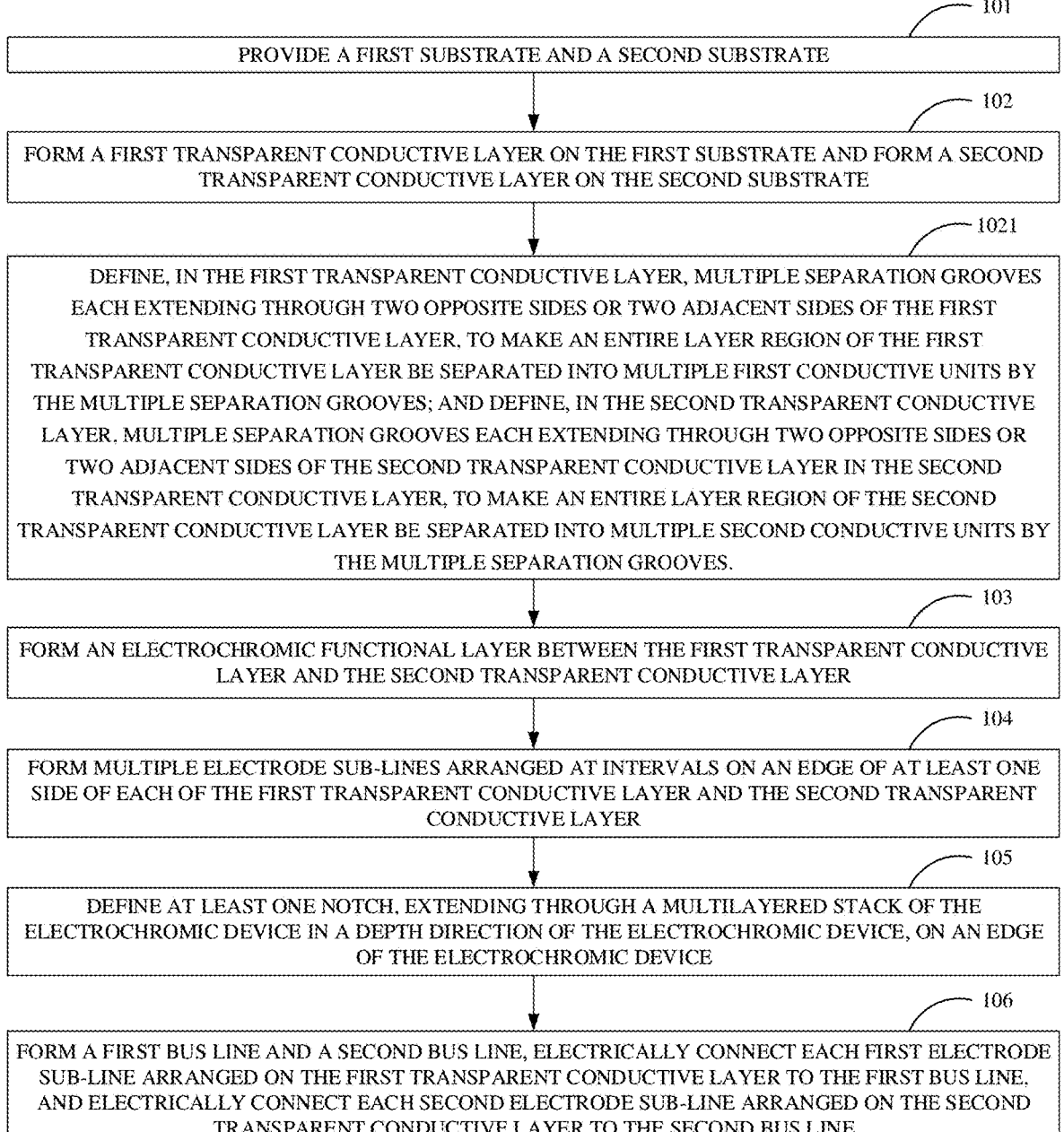
FIG. 11 is a flowchart of a method for manufacturing an electrochromic device provided in another embodiment of the present disclosure.

As illustrated in FIG. 11, another method for manufacturing an electrochromic device 1 is further provided in the present disclosure. The method includes the following.

At 101, a first substrate 41 and a second substrate 42 are provided.

At 102, a first transparent conductive layer 10 is formed on the first substrate 41, and a second transparent conductive layer 20 is formed on the second substrate 42.

At 1021, multiple separation grooves 13 extending through two opposite sides or two adjacent sides of the first transparent conductive layer 10 are defined in the first transparent conductive layer 10, to make an entire layer region of the first transparent conductive layer 10 be separated into multiple first conductive units 51 by the multiple separation grooves 13. Multiple separation grooves 23 extending through two opposite sides or two adjacent sides of the second transparent conductive layer 20 are defined in the second transparent conductive layer 20, to make an entire layer region of the second transparent conductive layer 20 be separated into multiple second conductive units 52 by the multiple separation grooves 23.

Specifically, the first substrate 41 and the first transparent conductive layer 10 constitute a first stacked structure. The second substrate 42 and the second transparent conductive layer 20 constitute a second stacked structure. For example, in some embodiments, for the first stacked structure and the second stacked structure, multiple separation grooves may be defined in each of the first transparent conductive layer 10 and the second transparent conductive layer 20 by means of laser ablation, mechanical cutting, etching, or the like.

It may be noted that each separation groove extends through two opposite sides or two adjacent sides of the transparent conductive layer, which means that the separation groove separates the transparent conductive layer in the depth direction, and extends from one side of the transparent conductive layer to an opposite side or an adjacent side of the transparent conductive layer in the extension direction of the separation groove, so that the transparent conductive layer is completely separated.

In this embodiment, the depth of each separation groove is greater than or equal to the thickness of the transparent conductive layer in the stacked structure where the separation groove is located, and less than or equal to the sum of the thickness of the transparent conductive layer in the stacked structure where the separation groove is located and 0.5 times the thickness of the substrate. In this way, not only can two adjacent conductive units in the same transparent conductive layer be ensured to be kept independent from each other by the separation groove, but also the integrity of the stacked structure can be ensured, facilitating the execution of subsequent machining processes.

At 103, an electrochromic functional layer 30 is formed between the first transparent conductive layer 10 and the second transparent conductive layer 20.

It can be understood that after the multiple separation grooves are defined, the electrochromic functional layer is formed, and some materials of the electrochromic functional layer are filled into the separation grooves. Therefore, visibility of the separation grooves can be reduced and visual experience of a user can be improved.

At 104, multiple electrode sub-lines arranged at intervals on an edge of at least one side of each transparent conductive layer are formed.

In this embodiment, an operation at 104 specifically includes the following.

An electrode sub-line, substantially completely covering an edge of a side of each conductive unit, is formed on the edge of the side of the conductive unit where the electrode sub-line is located.

Obviously, each conductive unit corresponds to one electrode sub-line. Each electrode sub-line substantially completely covers an edge of the conductive unit where the electrode sub-line is located. Therefore, the length of each electrode sub-line is determined according to the length of the edge of the conductive unit where the electrode sub-line is located. In other embodiments, the length of each electrode sub-line is less than or equal to the length of the edge of the conductive unit where the electrode sub-line is located.

The electrode sub-line completely covers the edge of the side of the conductive unit where the electrode sub-line is located. Therefore, when the external power supply is supplied, the operating current can be ensured to be conducted to the entire region of the conductive unit substantially uniformly.

It may be noted that in the present disclosure, an order of an operation at 1021 and the operation at 104 is not limited. In some embodiments, the operation at 104 may be executed first, and then the operation at 1021 is executed. In this way, the multiple electrode sub-lines are formed first, and then the multiple separation grooves are defined, which can ensure that the separation groove can separate two adjacent conductive units completely, thereby avoiding the situation where one electrode sub-line crosses two conductive units, and further avoiding repeated machining.

In some embodiments, the multiple electrode sub-lines on each transparent conductive layer are arranged on an edge of one side of the transparent conductive layer. The operation at 1021 and the operation at 104 can be combined into an operation at 104' to be executed together. The operation at 104' specifically includes the following. A first electrode line on an edge of a first side of the first transparent conductive layer 10 is formed and substantially covers the edge of the first side, and then multiple separation grooves 13 extending through the first side and an opposite side of the first side or an adjacent side of the first side are defined. The multiple separation grooves 13 separate an entire layer region of the first transparent conductive layer 10 into multiple first conductive units 51. The multiple separation grooves 13 further separate the first electrode line into multiple first electrode sub-lines 11. Each first conductive unit 51 corresponds to one first electrode sub-line 11. A second electrode line on an edge of a second side of the second transparent conductive layer 20 is formed and substantially covers the edge of the second side, and then multiple separation grooves 23 extending through the second side and an opposite side of the second side or an adjacent side of the second side are defined. The multiple separation grooves 23 separate an entire layer region of the second transparent conductive layer 20 into multiple second conductive units 52. The multiple separation grooves 23 further separate the second electrode line into multiple second electrode sub-lines 21. Each second conductive unit 52 corresponds to one second electrode sub-line 21. In this way, multiple electrode sub-lines are formed by cutting off the corresponding electrode line while defining the multiple separation grooves, so that each conductive unit corresponds to one electrode sub-line, which can simplify operations and improve production efficiency.

At 105, at least one notch 163 extending through a multilayered stack of the electrochromic device 1 in a depth direction of the electrochromic device 1 is defined on an edge of the electrochromic device 1.

The multilayered stack of the electrochromic device includes the first substrate 41, the first transparent conductive layer 10, the electrochromic functional layer 30, the second transparent conductive layer 20, and the second substrate 42.

It may be noted that when the electrochromic device 1 is applied to electrochromic glass with a relatively large height of segment, before the electrochromic device 1 is laminated with a sheet of finished glass, the notch 163 needs to be defined on the edge of the electrochromic device 1 to improve the fit and reduce wrinkles. In other embodiments, a position where the notch 163 is selected in the notch region 40 of the edge of the electrochromic device 1. Therefore, the multiple electrode sub-lines are ensured to be not cut off.

For example, the notch 163 may be defined by means of laser ablation, mechanical cutting, etching, or the like.

At 106, a first bus line 14 and a second bus line 24 are formed. Each first electrode sub-line 11 arranged on the first transparent conductive layer 10 is electrically connected to the first bus line 14. Each second electrode sub-line 21 arranged on the second transparent conductive layer 20 is electrically connected to the second bus line 24.

For example, the electrode sub-lines on each transparent conductive layer may be electrically connected to the corresponding bus line directly. In some embodiments, the method for manufacturing the electrochromic device 1 further includes the following. Multiple lead lines electrically connected to the multiple electrode sub-lines in a one-to-one correspondence are formed. Each electrode sub-line is electrically connected to the corresponding bus line through a lead line connected to the electrode sub-line.

Through the first bus line 14 and the second bus line 24, an external power supply is supplied. It can be understood that when the external power supply is supplied, the first bus line 14 can ensure that the first electrode sub-lines 11 arranged on the first transparent conductive layer 10 keep at the same electric potential, and the second bus line 24 may ensure that the second electrode sub-lines 21 arranged on the second transparent conductive layer 20 keep at the same electric potential.

For specific technical details of the operation at 101 to the operation at 104, reference may be made to relevant technical details in the embodiment illustrated in FIG. 10, which is not repeated herein.

It may be noted that different from the embodiment illustrated in FIG. 10, in this embodiment, by defining multiple separation grooves, the transparent conductive layer is separated into multiple conductive units, and then one electrode sub-line is formed on the edge of each conductive unit. Therefore, when the notch 163 is defined on the edge of the electrochromic device 1, only the electrode sub-line on the conductive unit where the notch 163 is located may be cut off. In this way, an influence range of defining the notch 163 can be narrowed to the conductive unit where the notch 163 is located, thereby ensuring that a conduction effect of an operating current in other complete conductive units is not affected.

As illustrated in FIG. 12, yet another method for manufacturing an electrochromic device 1 is further provided in the present disclosure. The method includes the following.

At 101, a first substrate 41 and a second substrate 42 are provided.

At 102, a first transparent conductive layer 10 is formed on the first substrate 41, and a second transparent conductive layer 20 is formed on the second substrate 42.

At 103, an electrochromic functional layer 30 is formed between the first transparent conductive layer 10 and the second transparent conductive layer 20.

At 104, multiple electrode sub-lines arranged at intervals on an edge of at least one side of each transparent conductive layer are formed.

At 1041, multiple separation grooves 13 each extending through two opposite sides or two adjacent sides of the first transparent conductive layer 10 are defined in the first transparent conductive layer 10, to make an entire layer region of the first transparent conductive layer 10 be separated into multiple first conductive units 51 by the multiple separation grooves 13. Multiple separation grooves 23 each extending through two opposite sides or two adjacent sides of the second transparent conductive layer 20 are defined in the second transparent conductive layer 20, to make an entire layer region of the second transparent conductive layer 20 be separated into multiple second conductive units 52 by the multiple separation grooves 23.

It may be noted that in this embodiment, the multiple separation grooves are defined on the multilayered stack formed by the first substrate 41, the first transparent conductive layer 10, the electrochromic functional layer 30, the second transparent conductive layer 20, and the second substrate 42. For example, multiple separation grooves may be defined on a side surface (e.g., a surface parallel to direction OZ in FIG. 4A) of the transparent conductive layer by means of laser ablation.

At 105, at least one notch 163 extending through a multilayered stack of the electrochromic device 1 in the depth direction of the electrochromic device 1 is defined on an edge of the electrochromic device 1.

For specific technical details of the operation at 101 to operation at 105 in this embodiment, reference may be made to relevant technical details in the embodiment illustrated in FIG. 11, which is not repeated herein.

It may be noted that different from the embodiment illustrated in FIG. 11, in this embodiment, since a process of defining the multiple separation grooves are similar to a process of defining the at least one notch 163, the operation of defining the multiple separation grooves and the operation of defining the at least one notch 163 may be executed in a unified manner after the operation at 104 is executed. In this way, the operation is more convenient, and the machining efficiency can be improved.

Figure 13:
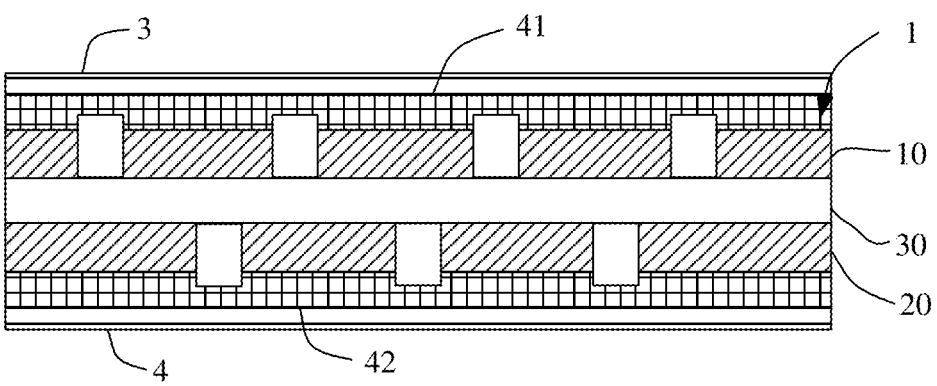
FIG. 13 is a schematic structural view of electrochromic glass provided in an embodiment of the present disclosure.

As illustrated in FIG. 13, electrochromic glass 2 is further provided in the present disclosure. The electrochromic glass 2 includes a first glass layer 3, a second glass layer 4, and the above electrochromic device 1. The electrochromic device 1 is disposed between the first glass layer 3 and the second glass layer 4. The first glass layer 3 faces the first substrate 41. The second glass layer 4 faces the second substrate 42.

It can be understood that FIG. 13 is merely an example of the electrochromic glass 2, and does not constitute a limitation on the electrochromic glass 2. The electrochromic glass 2 may include more "layers" than those illustrated in the figure. For example, the electrochromic glass 2 may further include an adhesive layer between the substrate and the glass layer, which is not limited herein.

A vehicle is further provided in the present disclosure. The vehicle includes the above electrochromic glass 2.

Although embodiments of the present disclosure have been illustrated and described, those of ordinary skill in the art may understand that various changes, modifications, substitutions, and variants may be made to these embodiments without departing from the principle and purpose of the present disclosure. The scope of the present disclosure is defined by the claims and their equivalents.

What is claimed is:

1. An electrochromic film, comprising:
   a first transparent conductive layer and a second transparent conductive layer, wherein the first transparent conductive layer is provided with a plurality of electrode sub-lines arranged at intervals on an edge of at least one side of the first transparent conductive layer, the second transparent conductive layer is provided with a plurality of electrode sub-lines arranged at intervals on an edge of at least one side of the second transparent conductive layer, and on a plane where the first transparent conductive layer or the second transparent conductive layer is located, orthographic projections of the plurality of electrode sub-lines of the first transparent conductive layer have at least a non-overlapping part with orthographic projections of the plurality of electrode sub-lines of the second transparent conductive layer; and
   an electrochromic functional layer disposed between the first transparent conductive layer and the second transparent conductive layer;
   wherein the plurality of electrode sub-lines on the first transparent conductive layer are arranged on edges of a pair of opposite sides of the first transparent conductive layer, and the plurality of electrode sub-lines on the second transparent conductive layer are arranged on edges of a pair of opposite sides of the second transparent conductive layer; and on each of the first transparent conductive layer and the second transparent conductive layer, electrode sub-lines at the same side of the pair of opposite sides are arranged at intervals, and electrode sub-lines at one side of the pair of opposite sides and electrode sub-lines at the other side of the pair of opposite sides are arranged in a staggered manner.

2. The electrochromic film of claim 1, wherein the first transparent conductive layer defines a plurality of separation grooves extending through two opposite sides or two adjacent sides of the first transparent conductive layer, and an entire layer region of the first transparent conductive layer where the plurality of separation grooves are defined is separated into a plurality of conductive units by the plurality of separation grooves; the second transparent conductive layer defines a plurality of separation grooves extending through two opposite sides or two adjacent sides of the second transparent conductive layer, and an entire layer region of the second transparent conductive layer where the plurality of separation grooves are defined is separated into a plurality of conductive units by the plurality of separation grooves; and wherein each conductive unit corresponds to one electrode sub-line, and two adjacent conductive units are kept independent from each other by a separation groove.

3. The electrochromic film of claim 2, wherein the plurality of separation grooves in the first transparent conductive layer are substantially parallel to or intersect with each other, and the plurality of separation grooves in the second transparent conductive layer are substantially parallel to or intersect with each other.

4. The electrochromic film of claim 1, wherein the first transparent conductive layer is provided with a plurality of electrode sub-lines arranged on edges of a first pair of opposite sides of the first transparent conductive layer, and the second transparent conductive layer is provided with a plurality of electrode sub-lines arranged on edges of a second pair of opposite sides of the second transparent conductive layer, and orthographic projections of the second pair of opposite sides on the plane where the first transparent conductive layer is located overlap the first pair of opposite sides.

5. The electrochromic film of claim 1, wherein the first transparent conductive layer is provided with the plurality of electrode sub-lines arranged on edges of a first pair of opposite sides of the first transparent conductive layer, and the second transparent conductive layer is provided with the plurality of electrode sub-lines arranged on edges of a second pair of opposite sides of the second transparent conductive layer, and orthographic projections of the second pair of opposite sides on the plane where the first transparent conductive layer is located intersect with the first pair of opposite sides.

6. The electrochromic film of claim 1, wherein the electrode sub-lines of the first transparent conductive layer are completely disposed on a surface of the first transparent conductive layer facing towards the second transparent conductive layer, and the second transparent conductive layer is free of electrode sub-lines in regions corresponding to the orthographic projections of the plurality of electrode sub-lines of the first transparent conductive layer; and the electrode sub-lines of the second transparent conductive layer are completely disposed on a surface of the second transparent conductive layer facing towards the first transparent conductive layer, and the first transparent conductive layer is free of electrode sub-lines in regions corresponding to the orthographic projections of the plurality of electrode sub-lines of the second transparent conductive layer.

7. An electrochromic device, comprising:
a first substrate and a second substrate; and
an electrochromic film, comprising:
    a first transparent conductive layer and a second transparent conductive layer, wherein the first transparent conductive layer is provided with a plurality of electrode sub-lines arranged at intervals on an edge of at least one side of the first transparent conductive layer, the second transparent conductive layer is provided with a plurality of electrode sub-lines arranged at intervals on an edge of at least one side of the second transparent conductive layer, and on a plane where the first transparent conductive layer or the second transparent conductive layer is located, orthographic projections of the plurality of electrode sub-lines of the first transparent conductive layer have at least a non-overlapping part with orthographic projections of the plurality of electrode sub-lines of the second transparent conductive layer; and an electrochromic functional layer disposed between the first transparent conductive layer and the second transparent conductive layer;
    wherein the plurality of electrode sub-lines on the first transparent conductive layer are arranged on edges of a pair of opposite sides of the first transparent conductive layer, and the plurality of electrode sub-lines on the second transparent conductive layer are arranged on edges of a pair of opposite sides of the second transparent conductive layer; and on each of the first transparent conductive layer and the second transparent conductive layer, electrode sub-lines at the same side of the pair of opposite sides are arranged at intervals, and electrode sub-lines at one side of the pair of opposite sides and electrode sub-lines at the other side of the pair of opposite sides are arranged in a staggered manner;
wherein
the electrochromic film is disposed between the first substrate and the second substrate; and the first substrate faces the first transparent conductive layer, and the second substrate faces the second transparent conductive layer.

8. The electrochromic device of claim 7, wherein the first transparent conductive layer and the first substrate adjacent to the first transparent conductive layer constitute a stacked structure, the stacked structure defines a plurality of separation grooves each extending through two opposite sides or two adjacent sides of the first transparent conductive layer in the stacked structure, and an entire layer region of the first transparent conductive layer where the plurality of separation grooves are located are separated into a plurality of conductive units by the plurality of separation grooves; the second transparent conductive layer and the second substrate adjacent to the second transparent conductive layer constitute a stacked structure, the stacked structure defines a plurality of separation grooves each extending through two opposite sides or two adjacent sides of the second transparent conductive layer in the stacked structure, and an entire layer region of the second transparent conductive layer where the plurality of separation grooves are located are separated into a plurality of conductive units by the plurality of separation grooves; and each conductive unit corresponds to one electrode sub-line, and two adjacent conductive units are kept independent from each other.

9. The electrochromic device of claim 8, wherein each of the plurality of separation grooves in the stacked structure of the first transparent conductive layer and the first substrate extends in a direction from the first transparent conductive layer to the first substrate, and each of the plurality of separation grooves in the stacked structure of the first transparent conductive layer and the first substrate has a depth greater than or equal to a thickness of the first transparent conductive layer, and is less than or equal to a sum of the thickness of the first transparent conductive layer and 0.5 times a thickness of the first substrate; and each of the plurality of separation grooves in the stacked structure of the second transparent conductive layer and the second substrate extends in a direction from the second transparent conductive layer to second substrate, and each of the plurality of separation grooves in the stacked structure of the second transparent conductive layer and the second substrate has a depth greater than or equal to a thickness of the second transparent conductive layer, and is less than or equal to a sum of the thickness of the second transparent conductive layer and 0.5 times a thickness of the second substrate.

10. The electrochromic device of claim 7, wherein the first transparent conductive layer defines a plurality of separation grooves extending through two opposite sides or two adjacent sides of the first transparent conductive layer, and an entire layer region of the first transparent conductive layer where the plurality of separation grooves are defined is separated into a plurality of conductive units by the plurality of separation grooves; the second transparent conductive layer defines a plurality of separation grooves extending through two opposite sides or two adjacent sides of the second transparent conductive layer, and an entire layer region of the second transparent conductive layer where the plurality of separation grooves are defined is separated into a plurality of conductive units by the plurality of separation grooves; and wherein each conductive unit corresponds to one electrode sub-line, and two adjacent conductive units are kept independent from each other by a separation groove.

11. The electrochromic device of claim 7, wherein the first transparent conductive layer is provided with a plurality of electrode sub-lines arranged on edges of a first pair of opposite sides of the first transparent conductive layer, and the second transparent conductive layer is provided with a plurality of electrode sub-lines arranged on edges of a second pair of opposite sides of the second transparent conductive layer, and orthographic projections of the second pair of opposite sides on the plane where the first transparent conductive layer is located overlap the first pair of opposite sides.

12. The electrochromic device of claim 7, wherein the first transparent conductive layer is provided with the plurality of electrode sub-lines arranged on edges of a first pair of opposite sides of the first transparent conductive layer, and the second transparent conductive layer is provided with the plurality of electrode sub-lines arranged on edges of a second pair of opposite sides of the second transparent conductive layer, and orthographic projections of the second pair of opposite sides on the plane where the first transparent conductive layer is located intersects with the first pair of opposite sides.

13. Electrochromic glass, comprising:
a first glass layer and a second glass layer; and
an electrochromic device, comprising:
    a first substrate and a second substrate; and
    an electrochromic film, comprising:
        a first transparent conductive layer and a second transparent conductive layer, wherein the first transparent conductive layer is provided with a plurality of electrode sub-lines arranged at intervals on an edge of at least one side of the first transparent conductive layer, the second transparent conductive layer is provided with a plurality of electrode sub-lines arranged at intervals on an edge of at least one side of the second transparent conductive layer, and on a plane where the first transparent conductive layer or the second transparent conductive layer is located, orthographic projections of the plurality of electrode sub-lines of the first transparent conductive layer have at least a non-overlapping part with orthographic projections of the plurality of electrode sub-lines of the second transparent conductive layer; and an electrochromic functional layer disposed between the first transparent conductive layer and the second transparent conductive layer;

wherein the plurality of electrode sub-lines on the first transparent conductive layer are arranged on edges of a pair of opposite sides of the first transparent conductive layer, and the plurality of electrode sub-lines on the second transparent conductive layer are arranged on edges of a pair of opposite sides of the second transparent conductive layer; and on each of the first transparent conductive layer and the second transparent conductive layer, electrode sub-lines at the same side of the pair of opposite sides are arranged at intervals, and electrode sub-lines at one side of the pair of opposite sides and electrode sub-lines at the other side of the pair of opposite sides are arranged in a staggered manner;

wherein the electrochromic film is disposed between the first substrate and the second substrate; and the first substrate faces the first transparent conductive layer, and the second substrate faces the second transparent conductive layer; wherein the electrochromic device is disposed between the first glass layer and the second glass layer; and the first glass layer faces the first substrate, and the second glass layer faces the second substrate.

14. A vehicle comprising the electrochromic glass of claim 13.

* * * * *